(12) United States Patent
Kim et al.

(10) Patent No.: US 9,686,706 B2
(45) Date of Patent: Jun. 20, 2017

(54) METHOD AND DEVICE FOR REPORTING POWER HEADROOM IN MOBILE COMMUNICATION SYSTEM FOR CARRIER AGGREGATION

(71) Applicant: Samsung Electronics Co., Ltd., Gyeonggi-do (KR)

(72) Inventors: Soeng Hun Kim, Gyeonggi-do (KR); Kyeong In Jeong, Gyeonggi-do (KR); Sang Bum Kim, Gyeonggi-do (KR); Han Na Lim, Seoul (KR); Jae Hyuk Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/384,123

(22) PCT Filed: Mar. 19, 2013

(86) PCT No.: PCT/KR2013/002224
§ 371 (c)(1),
(2) Date: Sep. 9, 2014

(87) PCT Pub. No.: WO2013/141558
PCT Pub. Date: Sep. 26, 2013

(65) Prior Publication Data
US 2015/0087296 A1 Mar. 26, 2015

Related U.S. Application Data

(60) Provisional application No. 61/612,950, filed on Mar. 19, 2012, provisional application No. 61/613,453, (Continued)

(51) Int. Cl.
*H04W 4/00* (2009.01)
*H04W 24/10* (2009.01)
(Continued)

(52) U.S. Cl.
CPC .......... *H04W 24/10* (2013.01); *H04W 52/04* (2013.01); *H04W 52/365* (2013.01);
(Continued)

(58) Field of Classification Search
USPC ....................................................... 455/423
See application file for complete search history.

(56) References Cited

U.S. PATENT DOCUMENTS 6,711,149 B1 * 3/2004 Yano ..................... H04W 36/18
370/331
8,203,987 B2 6/2012 Ishii et al.
(Continued)

FOREIGN PATENT DOCUMENTS

CN 101682896 3/2010
JP 2011-078019 4/2011
(Continued)

OTHER PUBLICATIONS

PCT/ISA/237 Written Opinion issued on PCT/KR2013/002224 (pp. 7).

(Continued)

*Primary Examiner* — Joel Ajayi
(74) *Attorney, Agent, or Firm* — The Farrell Law Firm, P.C.

(57) ABSTRACT

Provided are a method and apparatus for reporting power headroom in a mobile communication system supporting carrier aggregation. A user equipment (UE) determines the maximum transmit power for each carrier and the maximum UE transmit power, and sends a power headroom report that contains power headroom for each carrier computed based on the maximum transmit power for the carrier and the maximum UE transmit power to a corresponding base station (ENB).

8 Claims, 30 Drawing Sheets

Related U.S. Application Data filed on Mar. 20, 2012, provisional application No. 61/615,856, filed on Mar. 26, 2012, provisional application No. 61/620,957, filed on Apr. 5, 2012.

(51) Int. Cl.
| | | |
|---|---|---|
| *H04W 52/36* | (2009.01) | |
| *H04W 52/04* | (2009.01) | |
| *H04W 72/04* | (2009.01) | |
| *H04W 52/34* | (2009.01) | |

(52) U.S. Cl.
CPC ........ *H04W 72/0473* (2013.01); *H04W 52/34* (2013.01); *H04W 52/367* (2013.01)

(56) References Cited

U.S. PATENT DOCUMENTS

| | | |
|---|---|---|
| 2006/0281466 A1 | 12/2006 | Gholmieh et al. |
| 2007/0268877 A1 | 11/2007 | Buckley et al. |
| 2010/0273515 A1 | 10/2010 | Fabien et al. |
| 2010/0317356 A1 | 12/2010 | Roessel et al. |
| 2011/0092217 A1 | 4/2011 | Kim et al. |
| 2011/0195708 A1* | 8/2011 | Moberg ............ H04W 36/0094 455/424 |
| 2012/0002643 A1 | 1/2012 | Chung et al. |
| 2012/0314640 A1 | 12/2012 | Kim et al. |
| 2013/0044621 A1 | 2/2013 | Jung et al. |
| 2013/0176953 A1 | 7/2013 | Stern-Berkowitz et al. |

FOREIGN PATENT DOCUMENTS

| | | |
|---|---|---|
| JP | 2013-520917 | 6/2013 |
| KR | 1020110135863 | 12/2011 |
| KR | 1020110139978 | 12/2011 |
| KR | 1020120001981 | 1/2012 |
| RU | 2 411 697 | 2/2011 |
| WO | WO 98/01004 | 1/1998 |
| WO | WO 98/26625 | 6/1998 |
| WO | WO 2010/121662 | 10/2010 |
| WO | WO-2011/052312 | 5/2011 |
| WO | WO-2011/105856 | 9/2011 |
| WO | WO-2011/161014 | 12/2011 |
| WO | WO 2012/021138 | 2/2012 |
| WO | WO 2013/025562 | 2/2013 |

OTHER PUBLICATIONS

PCT/ISA/210 Search Report issued on PCT/KR2013/002224 (pp. 3).
MediaTek Inc., "Including PCMAX in Power Headroom Reporting", R1-111783, 3GPP TSG-RAN WG1 #65, May 9-13, 2011.
Korean Office Action dated May 19, 2015 issued in counterpart application No. 10-2014-7024514.
MediaTek Inc., "Reporting Pcmax", R1-113081, 3GPP TSG-RAN WG2 Meeting #74, May 9-13, 2011, 5 pages.
InterDigital Communications, "Pcmax Inclusion for Inter-band PHR", R2-116105, 3GPP TSG RAN WG2 #76, Nov. 14-18, 2011, 6 pages.
Korean Office Action dated Nov. 24, 2015 issued in counterpart application No. 10-2014-7024514, 4 pages.
European Search Report dated Nov. 25, 2015 issued in counterpart application No. 13764787.1-1870, 7 pages.
3rd Generation Partnership Project; Technical Specification Group Radio Access Network; Evolved Universal Terrestrial Radio Acess (E-UTRA).
Requirements for Support of Radio Resource Management (Release 10), 3GPP TS 36.133 V10.5.0, Dec. 2011, 544 pages.
Korean Office Action dated Feb. 19, 2016 issued in counterpart application No. 10-2016-7002994, 13 pages.
Ericsson, ST-Ericsson, "Multiple Frequency Band Indicators Per Cell", 3GPP TSG-RAN WG2 #75, Aug. 22-26, 2011, 5 pages.
3rd Generation Partnership Project; Technical Specification Group Radio Access Network Extending 850MHz Study Item Technical Report (Release 9).
3GPP TR 37.806 V1.1.0, Aug. 2011, 75 pages.
Japanese Office Action dated Nov. 7, 2016 issued in counterpart application No. 2015-501572, 6 pages.
Chinese Office Action dated Dec. 8, 2016 issued in counterpart application No. 201280040843.3, 19 pages.
Nokia Siemens Networks, Nokia, "General Considerations on New Carrier Types", R1-120711, 3GPP TSG RAN WG1 #68, Feb. 6-10, 2012, 4 pages.
Russian Office Action dated Jan. 20, 2017 issued in counterpart application No. 2014106662/08, 17 pages.
Japanese Office Action dated Mar. 6, 2017 issued in counterpart application No. 2015-501572, 5 pages.

* cited by examiner

METHOD AND DEVICE FOR REPORTING POWER HEADROOM IN MOBILE COMMUNICATION SYSTEM FOR CARRIER AGGREGATION

PRIORITY

This application is the National Stage under 35 U.S.C. 371 of International Patent Application No. PCT/KR2013/002224, filed on Mar. 19, 2013, which claimed priority to U.S. Prov. App. Ser. No. 61/612,950 filed on Mar. 19, 2012, U.S. Prov. App. Ser. No. 61/613,453 filed on Mar. 20, 2012, U.S. Prov. App. Ser. No. 61/615,856 filed on Mar. 26, 2012, and U.S. Prov. App. Ser. No. 61/620,957 filed on Apr. 5, 2012.

BACKGROUND

1. Field of the Disclosure

The present invention relates to a method and apparatus for reporting power headroom in a mobile communication system supporting carrier aggregation and, more particularly, to a method that determines maximum transmit power for each of multiple carriers and reports the determined maximum transmit power to a base station.

2. Description of the Related Art

In general, mobile communication systems have been developed to provide communication services while guaranteeing user mobility. Thanks to rapid technological advancement, mobile communication systems are capable of providing not only voice communication services but also high-speed data communication services.

Recently, the 3rd Generation Partnership Project (3GPP) has been working to standardize specifications for the Long Term Evolution (LTE) system as a next generation mobile communication system. The LTE system aims to realize high-speed packet based communication supporting a data rate of 100 Mbps exceeding existing data rates, and the specification thereof is near completion.

After completion of the release 8 specification, various technologies have been introduced to the LTE system to meet the ever increasing traffic demand. Carrier aggregation (CA) is a representative technology introduced to the release 10 LTE specification.

In existing communication, a single carrier is used in between a user equipment (UE) and a base station (ENB). When carrier aggregation is employed, a primary carrier and one or more secondary carriers may be used for communication between one UE and ENB, significantly increasing the data transfer rate by an amount corresponding to the number of secondary carriers. In other words, it may be considered that one cell is formed by a downlink carrier and an uplink carrier provided by the same ENB. In carrier aggregation, one UE may be considered as sending and receiving data through multiple cells in parallel. In this case, the maximum data rate of the UE may be increased in proportion to the number of aggregated carriers or cells.

In the LTE system, each carrier may be termed a component carrier (CC). A primary carrier may be termed a primary cell (PCell), and a secondary carrier may be termed a secondary cell (SCell).

Frequency resources are limited. As different countries may use different frequency resources or bands, it is not always possible to aggregate carriers belonging to the same frequency band only depending on circumstances. To solve this problem, the release 11 LTE specification provides enhanced carrier aggregation so that carriers belonging to different frequency bands can be aggregated together.

The fact that a UE receives data through a downlink carrier and transmits data through an uplink carrier may correspond in meaning to a case in which the UE sends and receives data using control and data channels provided by a cell corresponding to the center frequencies and frequency bands characterizing the carriers.

For the purpose of the description of the present invention, the terms used in general LTE system documents apply. For more details, TS 36.331 and TS 36.321 (2011 December) may be referred to.

Meanwhile, for uplink scheduling, a UE reports various scheduling information (for example, buffer status report and power headroom (PH) report) to the corresponding ENB. The ENB may allocate a suitable amount of uplink transmission resources to the UE in consideration of the buffer status and power headroom of the UE.

When carrier aggregation described above is employed, a UE may perform uplink transmission at more than one serving cell. As uplink transmission at multiple cells and uplink transmission at one cell may have different attributes, power headroom reporting (PHR) at a single cell may not be directly applicable.

SUMMARY

Accordingly, an aspect of the present invention is to provide a method and apparatus that enable, when a UE performs uplink transmission at one or more serving cells, the corresponding ENB to identify accurate power headroom of the UE and minimize the frequency of power headroom reporting.

In accordance with an aspect of the present invention, a method of reporting power headroom for a user equipment (UE) in a mobile communication system supporting multiple aggregated carriers is provided. The method may include: receiving configuration information for multiple carriers to be aggregated and power headroom reporting from a base station (ENB); determining, upon reception of resource allocation for uplink transmission to the ENB, the maximum transmit power for each carrier and the maximum UE transmit power; and sending a power headroom report that contains power headroom for each carrier computed based on the maximum transmit power for the carrier and the maximum UE transmit power to the ENB.

In accordance with another aspect of the present invention, a method of receiving a power headroom report from a user equipment (UE) in a mobile communication system supporting multiple aggregated carriers is provided. The method may include: sending configuration information for multiple carriers to be aggregated and power headroom reporting to the UE; sending resource allocation information for uplink transmission to the UE; receiving a power headroom report that contains power headroom for each carrier computed based on the maximum transmit power for the carrier and the maximum UE transmit power from the UE; and performing uplink scheduling for the UE on the basis of the power headroom report.

In accordance with another aspect of the present invention, an apparatus for reporting power headroom in a user equipment (UE) in a mobile communication system supporting multiple aggregated carriers is provided. The apparatus may include: a transceiver unit to send and receive signals to and from a base station (ENB) through multiple carriers; and a control unit to control a process of receiving configuration information for multiple carriers to be aggregated and power headroom reporting from the ENB, determining, upon reception of resource allocation for uplink transmission to the ENB, the maximum transmit power for each carrier and the maximum UE transmit power, and sending a power headroom report that contains power headroom for each carrier computed based on the maximum transmit power for the carrier and the maximum UE transmit power to the ENB.

In accordance with another aspect of the present invention, an apparatus for receiving a power headroom report from a user equipment (UE) in a mobile communication system supporting multiple aggregated carriers is provided. The apparatus may include: a transceiver unit to send and receive signals to and from the UE through multiple carriers; and a control unit to perform a process of sending configuration information for multiple carriers to be aggregated and power headroom reporting to the UE, sending resource allocation information for uplink transmission to the UE, receiving a power headroom report that contains power headroom for each carrier computed based on the maximum transmit power for the carrier and the maximum UE transmit power from the UE, and performing uplink scheduling for the UE on the basis of the power headroom report.

In a feature of the present invention, a data transmission and reception apparatus and method using multiple carriers are provided. Even when a UE performs uplink transmission simultaneously at multiple serving cells, the corresponding ENB may perform scheduling in consideration of power headroom of the UE.

DETAILED DESCRIPTION

Hereinafter, exemplary embodiments of the present invention are described as a solution to the above technical problem. Same names of defined entities may be used for ease of description of the present invention. Specific terms or words used in the description should be construed in accordance with the spirit of the present invention without limiting the subject matter thereof, and may be applied to other systems having similar technical backgrounds without significant modification.

Next, embodiments of the present invention are described with reference to the accompanying drawings.

Figure 1:
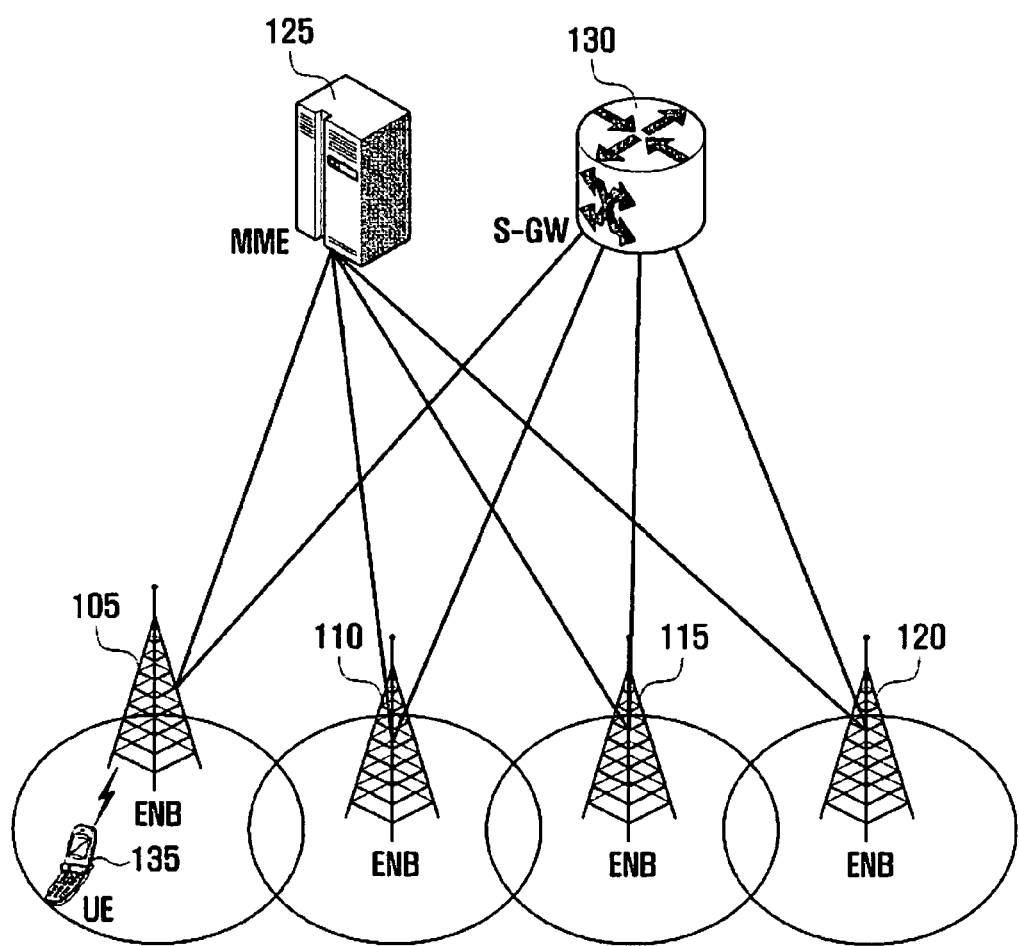
FIG. 1 illustrates an LTE system architecture, to which the present invention is applied.

FIG. 1 illustrates an LTE system architecture, to which the present invention is applied.

Referring to FIG. 1, the LTE radio access network is composed of base stations (Evolved Node Bs, ENBs) 105, 110, 115 and 120, a Mobility Management Entity (MME) 125, and a Serving-Gateway (S-GW) 130. A user equipment (UE) 135 may connect to an external network through the ENBs 105 to 120 and the S-GW 130.

The ENBs 105 to 120 may be connected to the UE 135 through wireless channels. The ENBs 105 to 120 correspond to Node Bs of the UMTS system, but perform more complex functions in comparison to existing Node Bs.

For example, in the LTE system, all user traffic including real-time services like VoIP (Voice over IP) services is served by shared channels.

Hence, it is necessary to perform scheduling on the basis of collected status information regarding buffers, available transmit powers and channels of UEs. Each of the ENBs 105 to 120 performs this scheduling function. To achieve a data rate of 100 Mbps in a 20 MHz bandwidth, the LTE system utilizes Orthogonal Frequency Division Multiplexing (OFDM) as radio access technology.

The UE 135 employs Adaptive Modulation and Coding (AMC) to determine the modulation scheme and channel coding rate according to channel states.

The S-GW 130 creates and removes data bearers for external networks and ENBs 105 to 120 under control of the MME 125. The MME 125 is connected to multiple ENBs and performs various control functions including mobility management for UEs.

Figure 2:
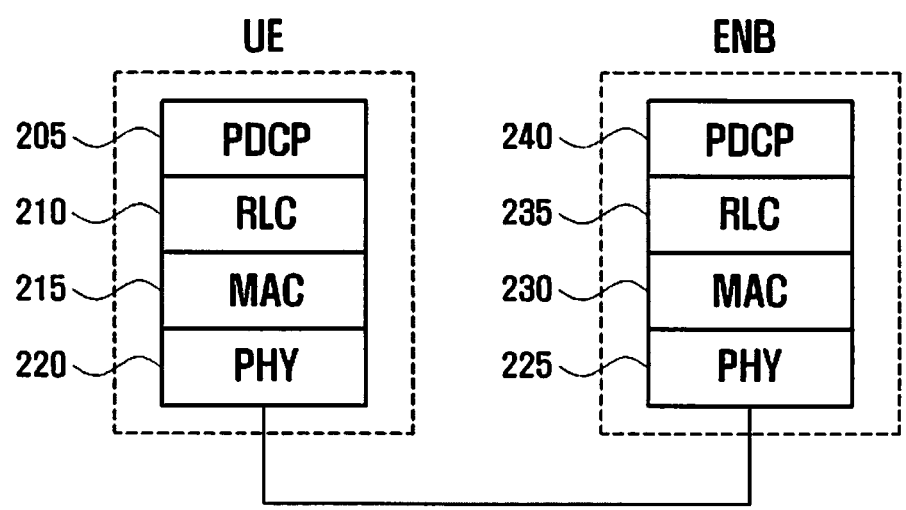
FIG. 2 illustrates a hierarchy of wireless protocols in the LTE system, to which the present invention is applied.

FIG. 2 illustrates a hierarchy of wireless protocols in the LTE system, to which the present invention is applied.

Referring to FIG. 2, in the LTE system, a UE and an ENB each include a wireless protocol stack composed of a PDCP (Packet Data Convergence Protocol) layer 205 or 240, an RLC (Radio Link Control) layer 210 or 235, a MAC (Medium Access Control) layer 215 or 230, and a physical (PHY) layer 220 or 225.

The PDCP layer 205 or 240 performs compression and decompression of IP headers. The RLC layer 210 or 235 reconfigures PDCP PDUs (Protocol Data Unit) to a suitable size to conduct ARQ operations.

The MAC layer 215 or 230 forms connections between multiple RLC layer entities and PHY layer entities in a UE. The MAC layer 215 or 230 multiplexes RLC PDUs into MAC PDUs and forwards the MAC PDUs to the PHY layer 220 or 225. The MAC layer 215 or 230 demultiplexes MAC PDUs into RLC PDUs and forwards the RLC PDUs to the RLC layer 210 or 235.

The PHY layer 220 or 225 converts higher layer data into OFDM symbols by means of channel coding and modulation and transmits the OFDM symbols through a wireless channel. The PHY layer 220 or 225 converts OFDM symbols received through a wireless channel into higher layer data by means of demodulation and channel decoding and forwards the data to higher layers.

Figure 3:
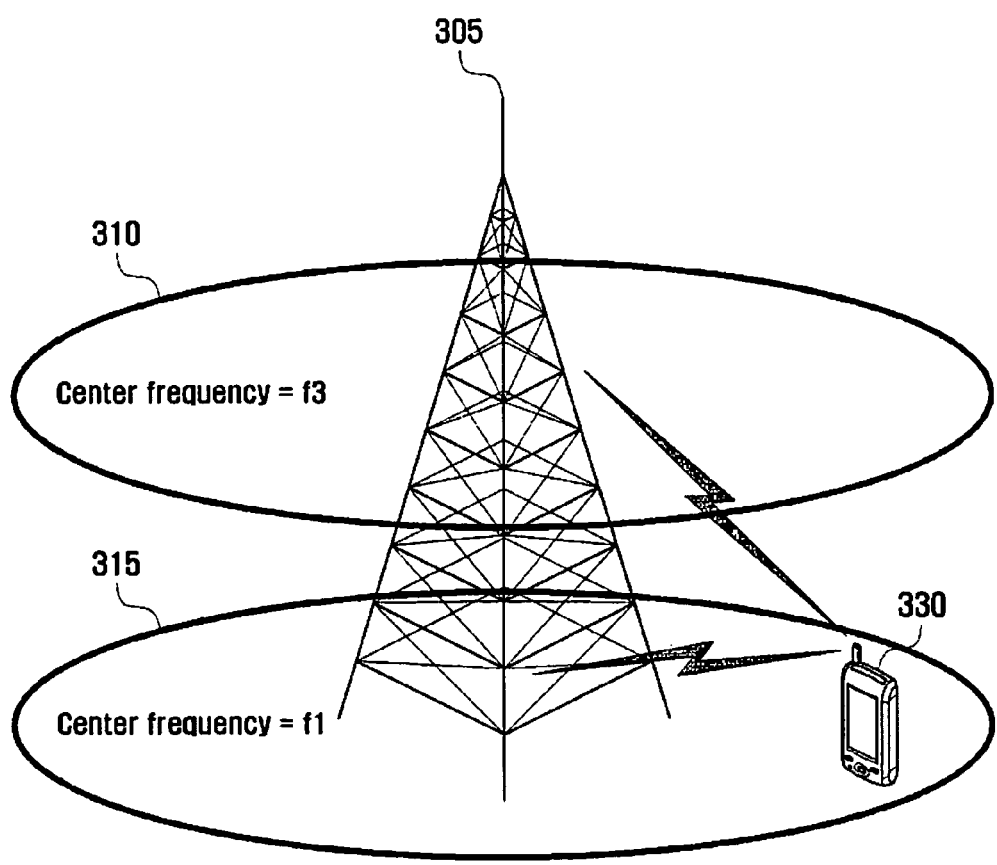
FIG. 3 depicts carrier aggregation.

FIG. 3 illustrates a user equipment sending signals using carrier aggregation in a mobile communication system according to an embodiment of the present invention.

In FIG. 3, the ENB 305 transmits signals to the UE 330 and receives signals from the UE 330 by use of multiple carriers across multiple frequency bands.

For example, assume that the ENB 305 may use a carrier 315 with a center frequency f1 and a carrier 310 with a center frequency f3. In a normal situation, the ENB 305 sends and receives signals to and from the UE 330 through one of the two carriers 310 and 315. However, the UE 330 having a carrier aggregation capability may use multiple carriers to send and receive signals.

Hence, the ENB 305 may assign a number of carriers or serving cells to the UE 330 having a carrier aggregation capability according to service conditions, increasing the data rate of the UE 330.

In the following description, "downlink" and "forward link" may be used interchangeably, and "uplink" and "reverse link" may be used interchangeably.

In the LTE system, the power headroom (PH) is related with the amount of transmit power usable by the UE, and refers to the difference between the maximum transmit power and the currently used transmit power of the UE. The power headroom may be defined with respect to the serving cell and the UE. The power headroom for the serving cell may be defined by the difference between the configured maximum UE transmit power for serving cell c $P_{CMAX,c}$ and the UE transmit power currently used in the serving cell. The power headroom for the UE (UE-specific power headroom) may be defined by the difference between the configured maximum UE transmit power $P_{CMAX}$ and the overall UE transmit power currently used at a given point in time.

As scheduling is performed on a cell basis, uplink scheduling is affected by the power headroom for the serving cell. In the current specification, the UE reports the power headroom only for the serving cell. However, in some cases, the UE-specific power headroom may be an importance factor for uplink scheduling.

As described above, the power headroom for the serving cell is the difference between the configured maximum UE transmit power for serving cell c $P_{CMAX,c}$ and the UE transmit power currently used in the serving cell, and may be expressed in Equations 1 to 3.

$$P_{CMAX\_L,c} \leq P_{CMAX,c} \leq P_{CMAX\_H,c} \quad \text{[Equation 1]}$$

$$P_{CMAX\_L,c} = \text{MIN}\{Pc_{EMAX,c} - T_{C,c}, P_{PowerClass} - \text{MAX}(MPR_c + A\text{-}MPR_{IB,c}, P\text{-}MPR_c) - T_{C,c}\} \quad \text{[Equation 2]}$$

$$P\text{-}CMAX\_H,c = \text{MIN}\{P_{Emax,c}, P_{PowerClass}\} \quad \text{[Equation 3]}$$

In Equation 1, $P_{EMAX,c}$ is the maximum allowed UE transmit power signaled by the eNB for serving cell c, and is sent to the UE through system information SIB1. $P_{PowerClass}$ is the maximum transmit power defined for each UE. $P_{CMAX\_L,c}$ is affected by various parameters as shown in Equation 2.

In Equation 2, $T_{C,c}$, $MPR_c$, $A\text{-}MPR_c$ and $T_{IB,c}$ are parameters defining limit values for adjusting the maximum UE transmit power in the serving cell to meet adjacent channel interference or spurious emission requirements, and are described in 3GPP TS 36.101. To be short, $MPR_c$ is related to the amount of uplink transmission resources (i.e. bandwidth) and modulation scheme assigned to the UE. $A\text{-}MPR_c$ is related to frequency bands, regional characteristics, and bandwidths for uplink transmission. $A\text{-}MPR_c$ is used to cope with a frequency band sensitive to adjacent spurious emission. $T_{C,c}$ is used to allow additional transmit power adjustment when uplink transmission is carried out at the edge of a frequency band. $T_{IB,c}$ is used to allow additional transmit power adjustment when uplink transmission is simultaneously carried out in several serving cells with different frequency bands.

$P\text{-}MPR_c$ is the maximum output power reduction applied to satisfy the Specific Absorption Rate (SAR) requirement (limiting the amount of radio frequency energy absorbed by the body to a preset level), and is determined according to the distance between the device and the body. For example, when a device is close to the body, a large $P\text{-}MPR_c$ value is applied to reduce the overall transmit power of the device. When a device is far from the body, a small $P\text{-}MPR_c$ value may be applied as there is no need to reduce the overall transmit power of the device.

The UE may determine the maximum and minimum values for $P_{CMAX,c}$ using Equations 2 and 3 first, and select a value satisfying various requirements at a given point in time from between the two values.

In addition, the configured maximum UE transmit power $P_{CMAX}$ may be determined according to Equations 4 to 6.

$$P_{CMAX\_L\_CA} \leq P_{CMAX} \leq P_{CMAX\_H\_CA} \quad \text{[Equation 4]}$$

$$P_{CMAX\_L\_CA} = \text{MIN} \quad \text{[Equation 5]}$$

$$\left\{ 10\log_{10} \sum \text{MIN}\left[\frac{P_{EMAX,c}}{t_{C,c}}, \frac{P_{PowerClass}}{(mpr_c, a\text{-}mpr_c, t_{C,c}, t_{IB,c})}, \frac{P_{PowerClass}}{pmpr_c, t_{C,c}}\right], P_{PowerClass}\right\}$$

$$P_{CMAX\_H\_CA} = \text{MIN}\{10\log_{10} \sum P_{EMAX,c}, P_{PowerClass}\} \quad \text{[Equation 6]}$$

Here, $mpr_c$, $a\text{-}mpr_c$ and $pmpr_c$ are the linear values of $MPR_c$, $A\text{-}MPR_c$ and $P\text{-}MPR_c$, respectively.

As Equation 4 indicates, $P_{CMAX}$ is autonomously selected by the UE and is not known to the ENB. Basically, the ENB performs uplink scheduling according to $P_{CMAX,c}$ on a cell basis. When the overall UE transmit power exceeds $P_{CMAX}$ as a result of cell-basis uplink scheduling, uplink transmission performance may be degraded. To prevent this, it is necessary for the UE to provide additional information to the ENB.

The relationship between $P_{CMAX,c}$ and $P_{CMAX}$ may be in one of the three cases.

Case 1: $P_{CMAX} = \text{MIN}\{\Sigma^{\log\ scale}\ P_{CMAX,c}, P_{PowerClass}\}$
$P_{CMAX}$ is equal to the sum of $P_{CMAX,c}$ (or equal to the maximum UE nominal transmit power $P_{PowerClass}$).

Case 2: $P_{CMAX} > \text{MIN}\{\Sigma^{\log\ scale}\ P_{CMAX,c}, P_{PowerClass}\}$
$P_{CMAX}$ is greater than the sum of $P_{CMAX,c}$.

Case 3: $P_{CMAX} < \text{MIN}\{\Sigma^{\log\ scale}\ P_{CMAX,c}, P_{PowerClass}\}$
$P_{CMAX}$ is less than the sum of $P_{CMAX,c}$.

For Case 1, the ENB may deduce $P_{CMAX}$ from the sum of $P_{CMAX,c}$. For Case 2, $P_{CMAX}$ does not affect scheduling. That is, the sum of uplink transmit powers for cells does not exceed $P_{CMAX}$. For Case 3, the sum of uplink transmit powers for cells may exceed $P_{CMAX}$, in which case the ENB needs to know UE $P_{CMAX}$.

Hence, in the present invention, it is possible to enforce the UE to report $P_{CMAX}$ to the ENB only when the sum of uplink transmit powers for cells exceeds the configured maximum UE transmit power (Case 3).

Meanwhile, the relationship between $P_{CMAX,c}$ and $P_{CMAX}$ may also be in one of the four cases.

Case 0: $P_{CMAX} = P_{PowerClass}$
$P_{CMAX}$ is equal to $P_{PowerClass}$
the ENB may perform scheduling in consideration of $P_{CMAX,c}$ only.

Case 1': $P_{CMAX} = \Sigma^{\log\ scale}\ P_{CMAX,c}$ & $P_{CMAX} < P_{PowerClass}$
$P_{CMAX}$ is less than $P_{PowerClass}$ and is equal to the sum of $P_{CMAX,c}$.
the ENB may perform scheduling in consideration of $P_{CMAX,c}$ only.

Case 2': $P_{CMAX} > \Sigma^{\log\ scale}\ P_{CMAX,c}$ & $P_{CMAX} < P_{PowerClass}$
$P_{CMAX}$ is greater than the sum of $P_{CMAX,c}$ and is less than $P_{PowerClasss}$.
the ENB may perform scheduling in consideration of $P_{CMAX,c}$ only.

Case 3': $P_{CMAX} < \Sigma^{\log\ scale}\ P_{CMAX,c}$ & $P_{CMAX} < P_{PowerClass}$
$P_{CMAX}$ is less than the sum of $P_{CMAX,c}$ and is less than $P_{PowerClass}$.
the sum of requested transmit powers may exceed $P_{CMAX}$ if the ENB performs scheduling in consideration of $P_{CMAX,c}$ only.

Among the four cases, the UE may have to report $P_{CMAX}$ to the ENB only in Case 3'.

Figure 4:
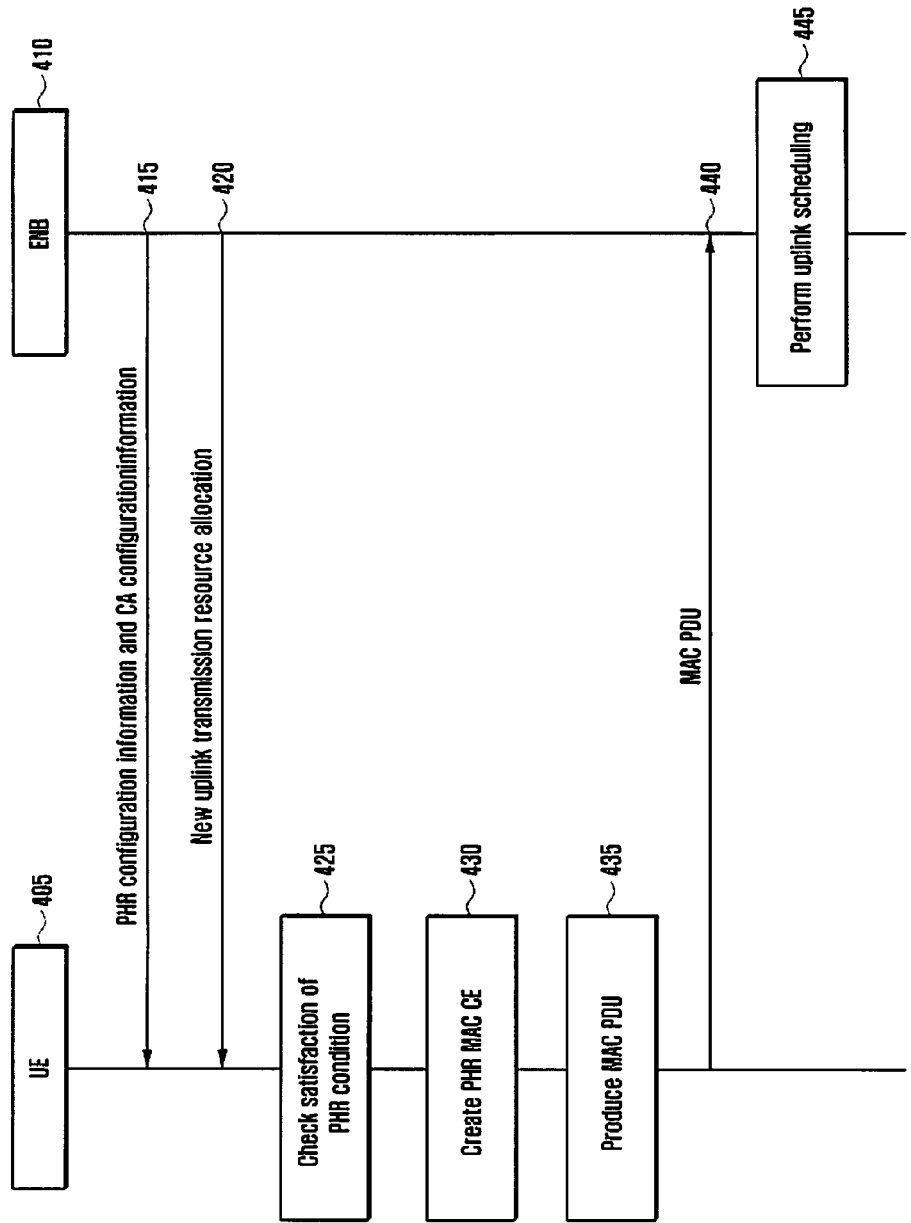
FIG. 4 illustrates power headroom reporting (PHR).

FIG. 4 depicts overall UE and ENB operation according to the above-described embodiment.

Referring to FIG. 4, in a mobile communication system including a UE 405 and ENB 410, at step 415, the ENB configures carrier aggregation and power headroom reporting (PHR) for the UE in consideration of UE capabilities and network conditions. When multiple carriers or multiple serving cells are configured in the UE for the uplink, the ENB may direct the UE to use the extended PHR functionality or extended PHR MAC CE (control element).

For extended PHR configuration, the ENB may provide the UE with the following PHR information (phr-Config).

periodicPHR-Timer: timer for periodic PHR. PHR is triggered upon expiration of this timer.

prohibitPHR-Timer: timer for preventing too frequent PHR. New PHR is not triggered while this timer is running.

dl-PathlossChange: when the downlink path loss has changed more than dl-PathlossChange (dB), new PHR is triggered. Or, when P-MPR change is greater than dl-PathlossChange new PHR is triggered.

extendedPHR: indicates whether to use extended PHR.

Upon reception of such control message, the UE may perform uplink and downlink configuration accordingly and perform subsequent operations.

At step 420, the ENB allocates transmission resources to the UE for new uplink transmission at a desired point in time. At step 425, the UE checks whether a PHR condition is satisfied. The PHR condition is met when at least one of the following events occurs.

periodicPHR-Timer expires.

prohibitPHR-Timer is not running and the path loss has changed more than dl-PathlossChange dB for at least one activated serving cell which is used as a pathloss reference since the last PHR transmission.

prohibitPHR-Timer is not running and the $P_{CMAX}$ reporting condition is satisfied. The $P_{CMAX}$ reporting condition is described later.

Upon satisfaction of the PHR condition, at step 430, the UE creates a PHR MAC CE. When PHR configuration indicates use of an extended PHR MAC CE, the UE computes the PH for each serving cell using Equation 7 in consideration of $P_{CMAX,c}$ and requested transmit powers for activated serving cells for uplink.

$$PH(i) = P_{CMAX,c}(i) - \{10 \log_{10}(M_{PUSCH,c}(i)) + P_{O\_PUSCH,c}(i) + \alpha_c(j) \cdot PL_c + \Delta_{TF,c}(i) \pm f_c(i)\} \quad \text{[Equation 7]}$$

As Equation 7 indicates, PH(i) (power headroom at $i^{th}$ subframe in serving cell c) is computed using $P_{CMAX,c}(i)$ (configured maximum UE output power), $M_{PUSCH,c}(i)$ (number of resource blocks), $\Delta_{TF,c}$ (power offset derived from the modulation coding scheme), $PL_c$ (pathloss), and $f_c(i)$ (accumulated TPC commands).

Here, $PL_c$ is pathloss of a cell configured to provide pathloss to the serving cell c. The pathloss used to determine uplink transmit power of a serving cell may be pathloss of a downlink channel of the serving cell or pathloss of a downlink channel of a different designated cell. The serving cell to be used for pathloss reference may be selected by the ENB and notified to the UE during call setup.

In addition, $f_c(i)$ is the accumulated value of transmission power control commands for the serving cell c. $P_{O\_PUSCH,c}$ is the sum of a cell-specific value and UE-specific value, and is determined by the ENB and notified to the UE. $\alpha_c$ is a 3-bit cell-specific value supplied by the higher layers, is used as a weighting for pathloss in uplink transmit power computation (namely, a larger value implies that the pathloss has a stronger influence on uplink transmit power), and is limited according to the types of PUSCH transmission. Here, j indicates the type of scheduling used for PUSCH transmission. For example, j=0 indicates PUSCH transmission using semi-persistently allocated transmission resources, j=1 indicates PUSCH transmission using dynamically allocated transmission resources, and j=2 indicates PUSCH transmission using transmission resources allocated during random access.

For a serving cell without actual transmission, PH is computed by use of $P_{CMAX,c}$ determined by setting transmit power reduction to zero (0) and requested transmit powers determined by setting $M_{PUSCH,c}(i)$ and $\Delta_{TF,c}$ to preset values (e.g. values corresponding respectively to the lowest MCS level and one transmission resource block). When transmit power reduction is set to zero, $P_{CMAX,c}$ and $P_{CMAX\_H,c}$ are the same. Virtual PH reported by setting $M_{PUSCH,c}(i)$ and $\Delta_{TF,c}$ to preset values in the absence of actual transmission may be meaningfully utilized by the ENB for uplink scheduling on the serving cell in the near future.

The format of PHR MAC CE is described later.

At step 435, the UE creates a MAC PDU and multiplexes the PHR MAC CE onto the MAC PDU. At step 440, the UE sends the MAC PDU to the ENB.

The UE maintains information on pathloss, $P_{CMAX}$, $P-MPR_c$ used for PH computation per serving cell and may use this information to check PHR condition satisfaction in later uplink transmission.

Upon reception of the PHR MAC CE from the UE, at step 445, the ENB performs uplink scheduling for the corresponding serving cell in consideration of PH per serving cell and $P_{CMAX,c}$. In addition, when $P_{CMAX}$ is contained in the PHR MAC CE, the ENB performs uplink scheduling so that the sum of UE uplink transmit powers does not exceed $P_{CMAX}$.

Figure 5:
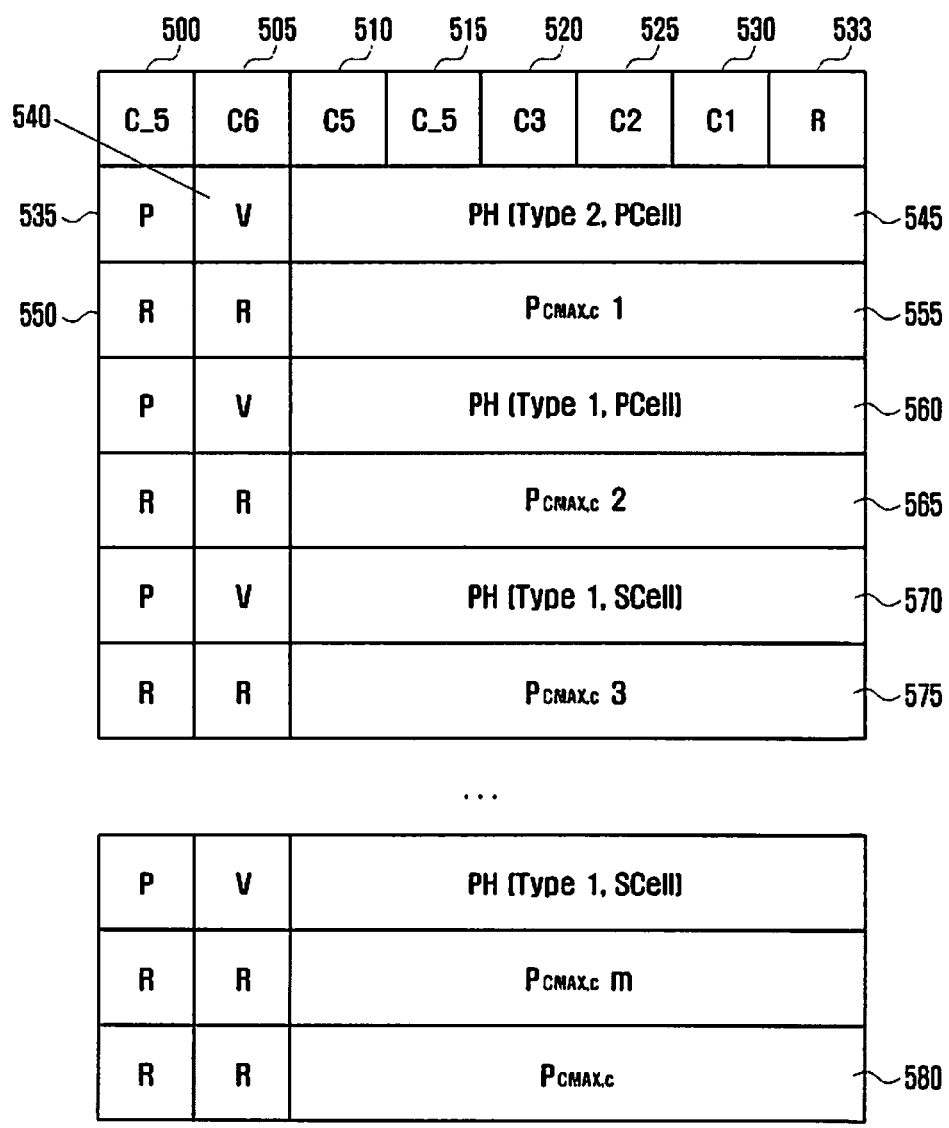
FIG. 5 illustrates an extended PHR format.

FIG. 5 illustrates the format of an extended PHR MAC CE.

To report power headroom for several serving cells in a mobile communication system with multiple aggregated carriers, it is advantageous to send them in one PHR because of lower overhead. Unlike the existing PHR MAC CE, the extended PHR MAC CE is designed to report multiple pieces of information such as PH and $P_{CMAX,c}$ for several cells. In FIG. 5, reference numerals 500 to 530 forms a bitmap indicating serving cells whose PH information is included in this extended PHR MAC CE.

Each Ci bit corresponds to one SCell. Ci and SCell are related by SCell index i. SCell index is notified by the ENB to the UE when SCell is assigned to the UE. The last bit 533 of the first byte is an unused (reserved) bit in the current specification, but may be used to indicate presence of $P_{CMAX}$ information in the present invention.

In a given byte, the P bit 535 indicates whether the configured maximum UE transmit power $P_{CMAX}$ is affected by $P-MPR_c$. As described before, in the absence of actual PUSCH transmission at a serving cell, the UE may compute a PH value by use of a virtual transmission format and assumed $P_{CMAX,c}$. When a computed PH value is reported for a serving cell without actual uplink transmission, a given bit (V field 540) of the corresponding byte is set to a preset value to indicate such computed PH information. Here, the V field 540 is a 1-bit indicator used for this purpose.

The V field 540 may be set to a value (e.g. 0) when the PH value for a corresponding cell is computed based on real PUSCH transmission (using an actual transmission format), and may be set to another value (e.g. 1) when the PH value to be reported is computed using a reference format (i.e. RB count=1, $\Delta_{TF}=0$) and virtual $P_{CMAX,c}$ because of no real PUSCH transmission at the corresponding cell.

The fields 545 and 555 may store PH and $P_{CMAX,c}$ values. Both PH and $P_{CMAX,c}$ values are reported for a serving cell with actual uplink transmission, and only a PH value is reported for a serving cell without actual uplink transmission. Here, uplink transmission may refer to PUSCH transmission and/or PUCCH transmission. The ENB collects and analyzes $P_{CMAX,c}$ values for serving cells with actual uplink transmission, and use the analysis result for uplink scheduling in the near future.

From the second byte in FIG. 5, a pair of PH and $P_{CMAX,c}$ values (for a serving cell with real uplink transmission) or a $P_{CMAX,c}$ value (for a serving cell without real uplink transmission) are stored in the fields 545, 555, 560, 565, 570 and 575 in a given order. Information related to PCell is stored first, and values related to currently active SCells are stored in ascending order of SCell index. For PCell, two types of PH values (Type 1 PH and Type 2 PH) may be stored. Type 1 PH is a value computed in consideration of PUSCH transmission only, and Type 2 PH is a value computed in consideration of both PUSCH transmission and PUCCH transmission.

In addition, when the $P_{CMAX}$ reporting condition is satisfied, the UE stores $P_{CMAX}$ in the last byte 580 of the extended PHR MAC CE. Like $P_{CMAX,c}$, $P_{CMAX}$ is represented by a 6-bit index indicating one of preset power levels.

As described above, whether $P_{CMAX}$ is stored in the PHR MAC CE may be indicated by a given bit such as the field 533. Alternatively, whether $P_{CMAX}$ is stored may be implicitly indicated by the size of the PHR MAC CE. For example, assume that the bitmap and PH values have a size of X bytes. Then, the size of the PHR MAC CE may be set to X+1 (bytes) when $P_{CMAX}$ is stored, and may be set to X (bytes) when $P_{CMAX}$ (is not stored.

$P_{CMAX}$ reporting conditions for the UE may include various conditions illustrated below.

[$P_{CMAX}$ Reporting Condition 1]
at least two different frequency bands are used by one or more serving cells at which uplink transmission is performed,
$P_{CMAX}$ is less than $P_{PowerClass}$, and
the sum of $P_{CMAX,c}$ for serving cells at which uplink transmission is performed is greater than $P_{CMAX}$ (i.e. in a PHR MAC CE containing $P_{CMAX}$, the sum of contained $P_{CMAX,c}$ values is greater than contained $P_{CMAX}$).

[$P_{CMAX}$ Reporting Condition 2]
at least two different frequency bands are used by one or more serving cells at which uplink transmission is performed,
$P_{CMAX}$ is less than $P_{PowerClass}$, and
when one $P_{CMAX,c}$ value is selected for each of serving cells at which uplink transmission is performed, the sum of the selected $P_{CMAX,c}$ values is greater than $P_{CMAX}$. Here, for each serving cell, the UE selects the $P_{CMAX,c}$ value used to compute Type 1 PH (e.g., when a first $P_{CMAX,c}$ value associated with Type 1 PH and a second $P_{CMAX,c}$ value associated with Type 2 PH are both reported for PCell, the UE selects the first $P_{CMAX,c}$ value associated with Type 1 PH).

[$P_{CMAX}$ Reporting Condition 3]
at least two different frequency bands are used by one or more serving cells at which uplink transmission is performed,
$P_{CMAX}$ is less than $P_{PowerClass}$, and
when one $P_{CMAX,c}$ value is selected for each of serving cells at which uplink transmission is performed, the sum of the selected $P_{CMAX,c}$ values is greater than $P_{CMAX}$. Here, for each serving cell, the UE selects the $P_{CMAX,c}$ value related to computation of the PH value based on the actual transmission format (e.g., for PCell, when a first $P_{CMAX,c}$ value associated with Type 1 PH and a second $P_{CMAX,c}$ value associated with Type 2 PH are both reported and only PUCCH transmission is performed, the UE selects the second $P_{CMAX,c}$ value associated with Type 2 PH).

Figure 6:
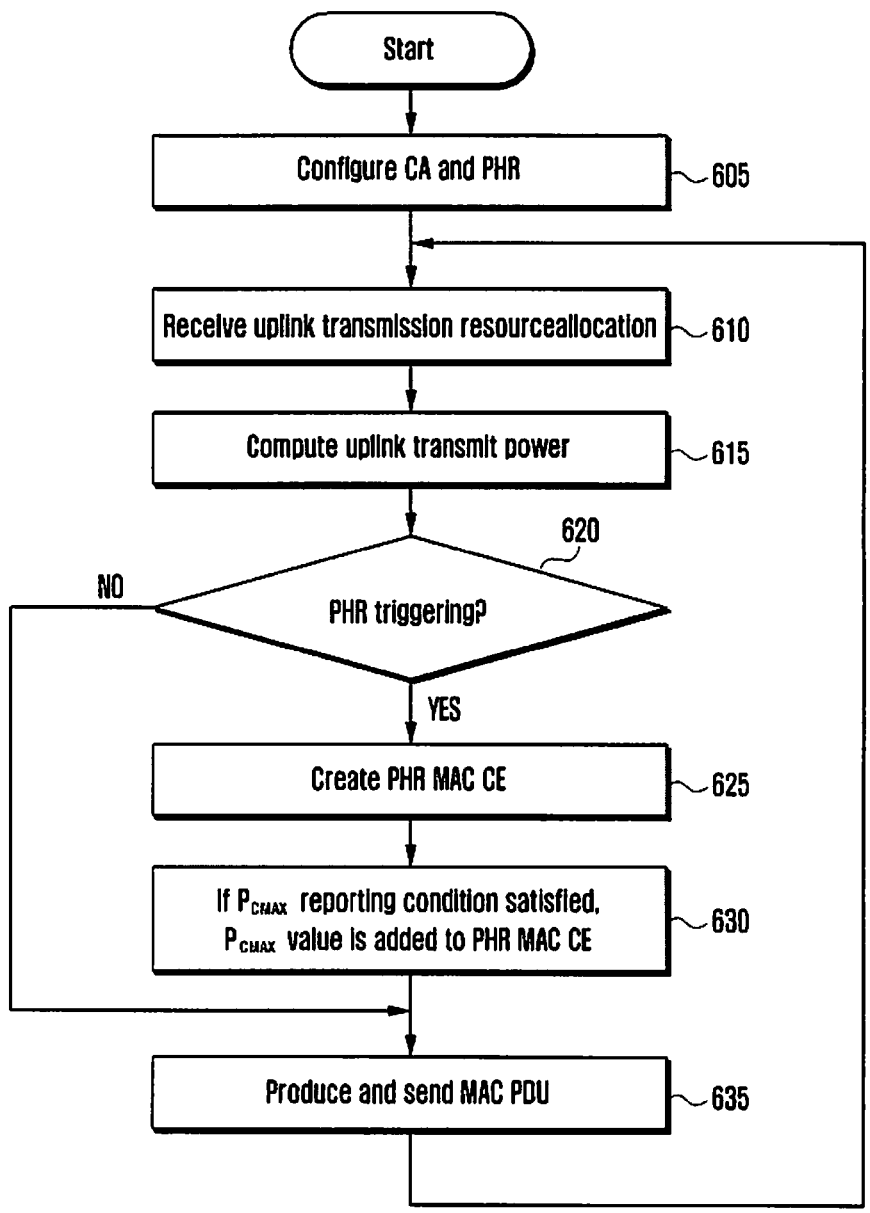
FIG. 6 illustrates UE operation for PHR.

FIG. 6 illustrates UE operation for PHR transmission to the ENB.

Referring to FIG. 6, at step 605, the UE receives a control message indicating CA and extended PHR configuration and configures multiple serving cells and extended PHR according to the contents of the control message. The control message contains control information such as phr-config and extendedPHR. Thereafter, the UE performs normal operation.

At step 610, the UE receives allocation of transmission resources for new uplink transmission. At step 615, the UE computes uplink transmit power. Uplink transmit power is calculated for each serving cell. Specifically, for each serving cell, the UE determines $P_{CMAX,c}$ by applying Equations 1, 2 and 3, determines requested transmit power in consideration of the number of transmission resource blocks, transmission format, pathloss, and the like, and selects the smaller one of the two values as transmit power of the serving cell.

At step 620, the UE examines triggering of PHR. The UE may regard expiration of prohibitPHR-Timer or satisfaction of the PHR reporting condition as PHR trigger.

At step 625, the UE computes the PH value for each serving cell as indicated by Equation 4 in consideration of $P_{CMAX,c}$ values of currently active serving cells with uplink assignment and requested transmit powers. The UE stores the PH values for serving cells and other information in an extended PHR MAC CE as illustrated in FIG. 5. At step 630, if the $P_{CMAX}$ reporting condition is satisfied, the UE adds the current $P_{CMAX}$ value to the extended PHR MAC CE.

At step 635, the UE adds the extended PHR MAC CE to a MAC PDU and sends the MAC PDU. Thereafter, the UE waits for allocation of new uplink transmission resources.

Second Embodiment

When disasters such as an earthquake and tidal wave occur, this must be promptly notified to the general public. Mobile communication systems such as LTE have a great advantage to delivery of Public Warning System (PWS) messages. For example, numerous persons carry mobile communication terminals and it is possible to provide information to most mobile communication terminals in real time.

Security issues such as hacking have become increasingly serious and widespread. As transmission of falsified PWS messages may cause serious disorder, it is necessary to deliver security information together with PWS messages so that integrity of the PWS messages may be verified.

Figure 7:
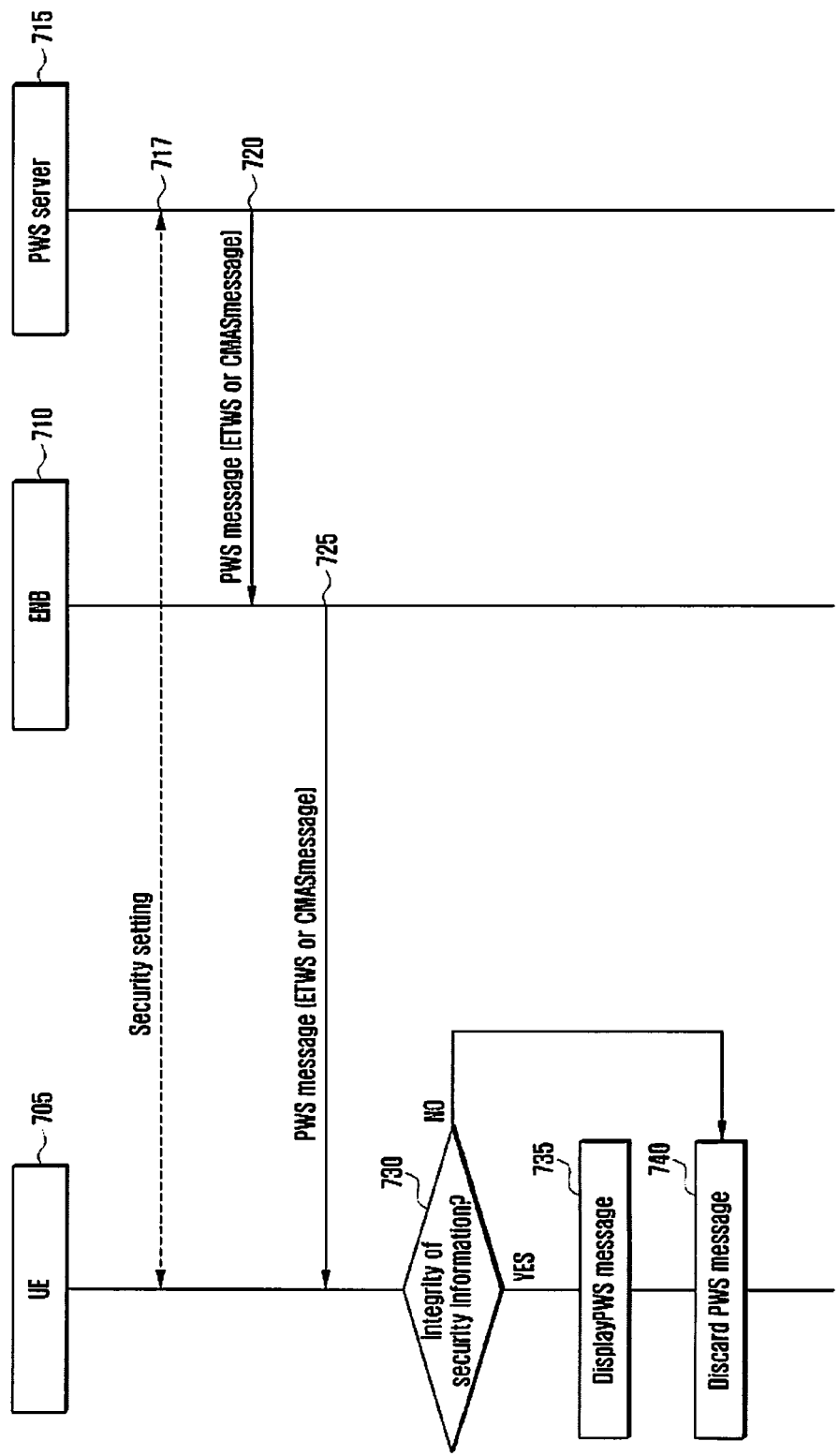
FIG. 7 illustrates a procedure for PWS message transmission and reception.

FIG. 7 illustrates a procedure whereby the ENB delivers a PWS message from a PWS server to the UE.

Referring to FIG. 7, to handle transmission of PWS messages, at step 717, the UE 705 performs a security setting procedure with a PWS server 715 to reach an agreement on security keys and algorithms in advance.

When an event requiring PWS message transmission occurs, at step 720, the PWS server 715 sends a PWS message to the ENBs 710. The PWS message contains both emergency description, evacuation measure and the like as contents and security information. PWS is commonly known as ETWS (Earthquake Tsunami Warning System) or CMAS (Commercial Mobile Alert System). In the description, these terms may be used interchangeably.

At step 725, the ENB transmits the PWS message by use of a common control message such as system information so that all UEs remaining in cells managed by the ENB can receive the PWS message.

Upon reception of the PWS message, at step 730, the UE checks integrity of the PWS message using security information contained in the message. That is, integrity checking is performed. If integrity checking is successful, at step 735, the UE delivers the PWS message to the user by displaying the PWS message on the screen. If integrity checking is unsuccessful, at step 745, the UE ignores and discards the PWS message.

On some occasions, a UE may be attached to a wireless network in limited service state. For example, when a network operator permitting access is not present in a given region at a particular point in time, or when the USIM is not installed, the UE may be attached to a wireless network in limited service state during which only an emergency call is usable. When a UE is in limited service state, the UE may be unable to process security information as the UE cannot receive imperatively necessary information from the network operator. Hence, the UE in limited service state may be unable to deliver a PWS message containing security information to the user.

It is reasonable to assume that only a small number of UEs are in limited service state within one wireless network. Hence, although a UE in limited service state delivers a falsified PWS message to the user, this may be not a serious problem. On the other hand, when a UE in limited service state does not deliver a PWS message to the user, a vital problem may occur. As a result, it is undesirable for a UE failing to handle security information to unconditionally discard a PWS message. Rather, when a UE fails to process security information, it is desirable to check whether the cause is limited service state first, and to determine whether to discard the PWS message or to deliver the PWS message to the user.

Figure 8:
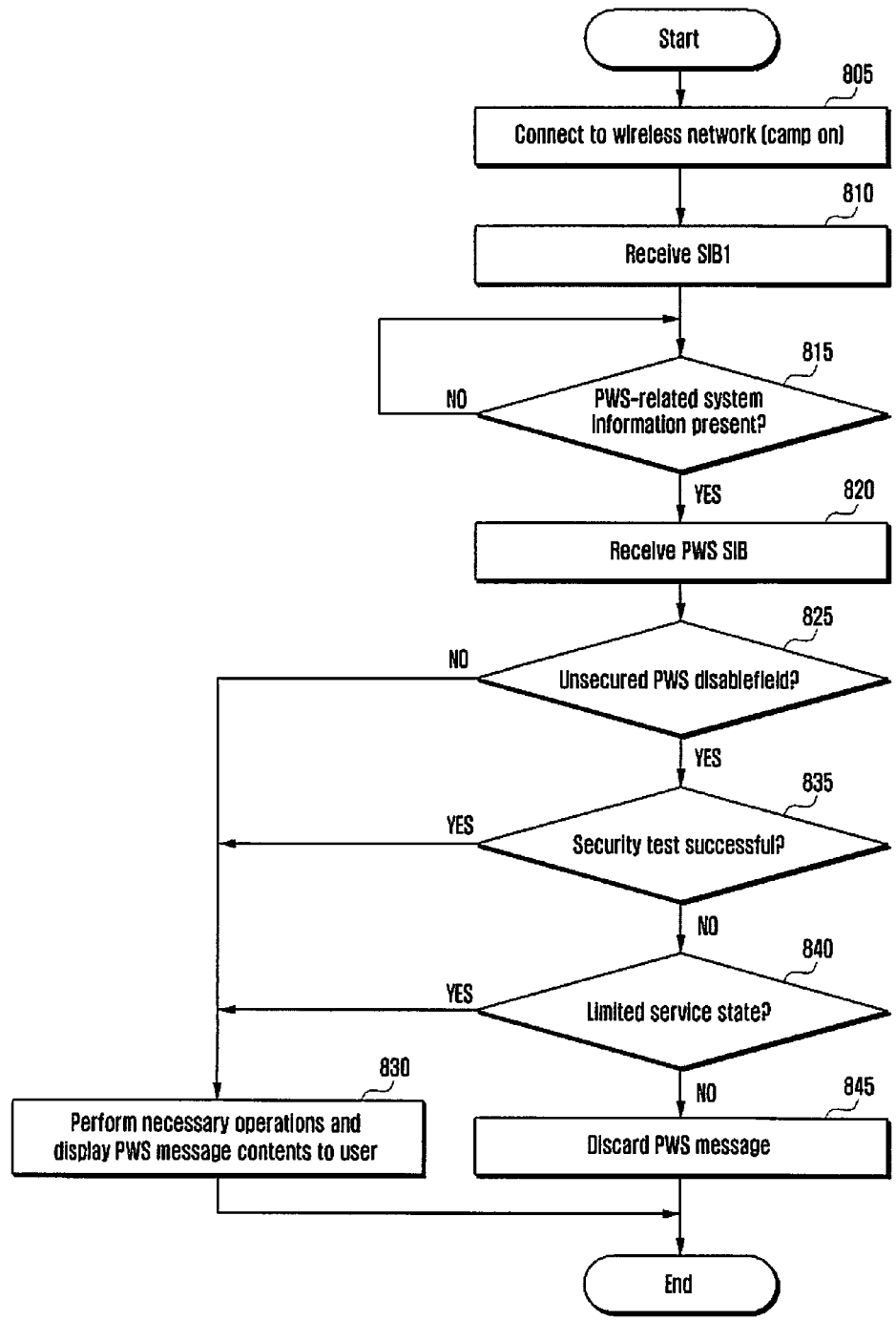
FIG. 8 illustrates UE operation for PWS message reception.

FIG. 8 illustrates UE operation in consideration of limited service state.

At step 805, the UE connects to a wireless network. The wireless network may be an LTE network or UMTS network. Connection to a wireless network indicates identification of a wireless network sending receivable radio signals and preparation of communication at a cell of the wireless network. In other words, the UE performs a registration procedure with the wireless network and checks reception of a paging message through a paging channel of the wireless network. When a UE is connected to a wireless network in limited service state, this indicates that the UE does not perform registration or has failed in registration.

The UE camps on a cell satisfying preset conditions (e.g. having common channel signal strength greater than or equal to a given threshold) among cells of the connected wireless network, and receives system information to perform necessary operations in the cell. The system information is broadcast in the form of System Information Block (SIB). In particular, SIB 1 is used to provide scheduling information for system information elements.

At step 810, the UE receives SIB 1. At step 815, the UE checks whether PWS-related system information is scheduled. SIB 10, SIB 11 and SIB 12 are examples of PWS-related system information. When PWS-related system information is not present at the corresponding cell, this indicates that a PWS message is not sent at the current point in time, and the UE performs regular operations until PWS-related system information is scheduled. When PWS-related system information is scheduled, at step 820, the UE receives PWS-related system information at a given point in time according to the scheduling information.

At step 825, the UE examines an option for handling an unsecure PWS message. Examples of unsecure PWS messages includes a PWS message whose security information is not verified, a PWS message having failed in integrity test, and a PWS message having failed in security test.

To deal with an unsecure PWS message, an "unsecured PWS disable" field may be provided in a stable storage (e.g.

USIM) of the UE. When the unsecured PWS disable field is set to "Yes", the UE does not process a PWS message having failed in security test; and when the unsecured PWS disable field is set to "No", the UE processes even a PWS message having failed in security test. Here, processing of a PWS message indicates displaying or notifying the contents of the PWS message to the user.

If the unsecured PWS disable field is set to "No" at step 825, the procedure proceeds to step 830. Otherwise, the procedure proceeds to step 835.

At step 830, the UE performs necessary operations and displays contents of the PWS message to the user. Here, the necessary operations may include filtering of repeatedly received messages.

At step 835, the UE checks whether the PWS message is secure by applying security test to the security information of the PWS message. A secure PWS message refers to a PWS message that is sent by a trusted device and is not falsified during transmission.

If the PWS message is a secure message, the procedure proceeds to step 830. Otherwise (e.g. failure of or in security test such as integrity test), the procedure proceeds to step 840. At step 830, the UE performs necessary operations and displays contents of the PWS message to the user.

At step 840, the UE checks whether it is in limited service state. When a UE is in limited service state, the UE can receive only a restricted service (for example, only emergency calls are allowed). If the USIM is not inserted, if the UE is unable to find a suitable cell to camp on, or if the UE fails in registration, the UE enters limited service state. A suitable cell is a cell conforming to the following conditions.

Namely, a suitable cell refers to a cell that belongs to a registered Public Land Mobile Network (registered PLMN), equivalent PLMN or selected PLMN, allows roaming thereto, and satisfies a cell selection criterion.

An equivalent PLMN, like the home PLMN, is a PLMN in which a UE may register to receive services. A UE may have multiple equivalent PLMNs. A list of equivalent PLMNs may be signaled by the network to the UE or may be stored in the memory. When the UE attempts to register in a particular PLMN, the PLMN is referred to as a selected PLMN before completion of registration.

Satisfaction of the cell selection criterion indicates that received signal quality of the common channel is higher than or equal to a preset threshold, and is detailed in 3GPP TS 36.304 (clause 5.2.3.2).

If in limited service state at step 840, the procedure proceeds to step 830 at which the UE performs necessary operations and displays contents of the PWS message to the user. If not in limited service state, the procedure proceeds to step 845 at which the UE discards the received PWS message.

In FIG. 8, determination operations at steps 825, 835 and 840 may be performed in a different sequence.

Figure 9:
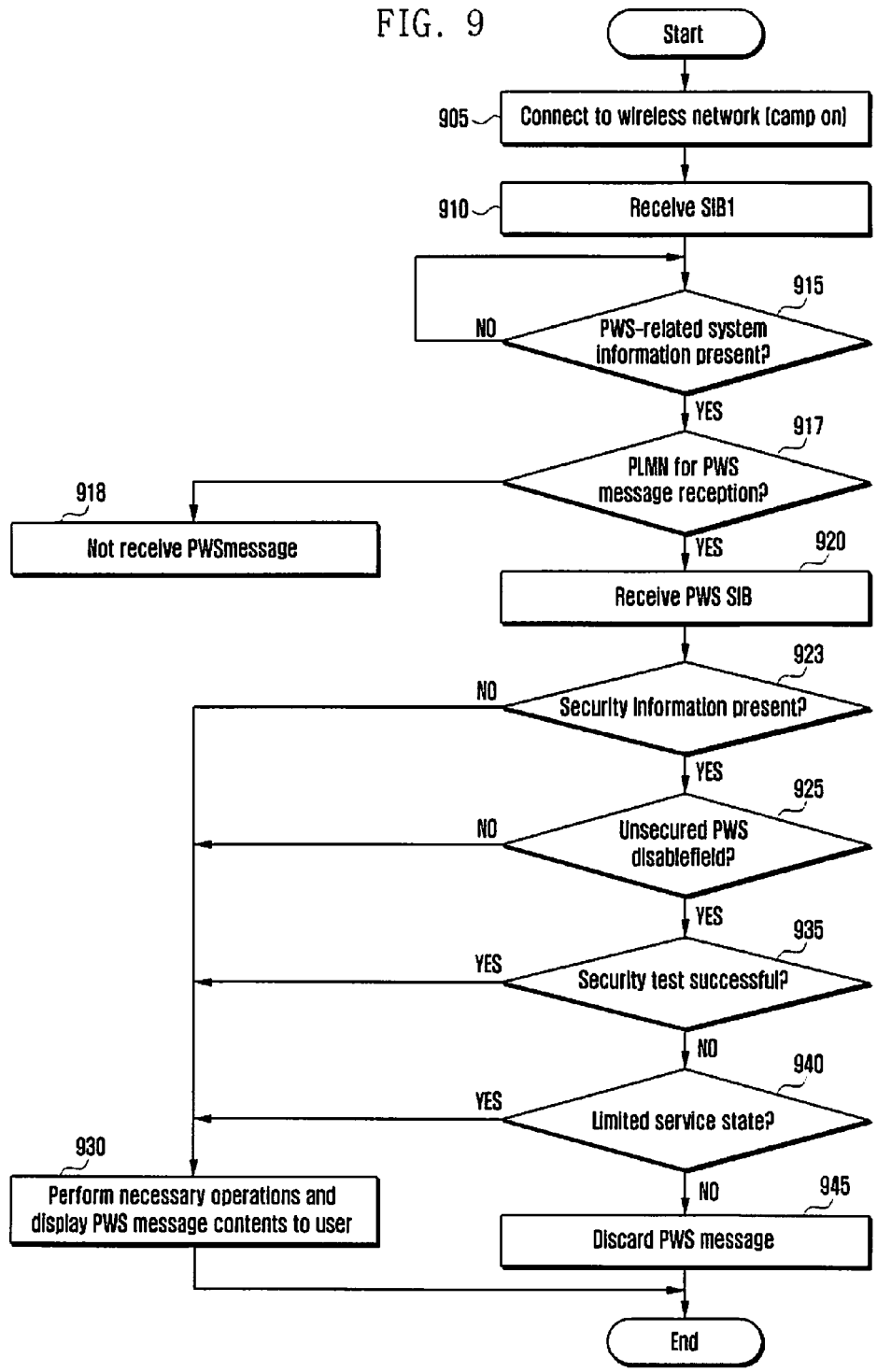
FIG. 9 illustrates another UE operation for PWS message reception.

FIG. 9 illustrates another UE operation for PWS message reception.

It may be undesirable to apply a security procedure to all PWS messages. For example, application of a security procedure to PWS messages may be prohibited by national laws or regulations. To define a uniform format for PWS messages, it is possible to consider a scheme that inserts security information to all PWS messages and introduces an indicator indicating whether to apply a security procedure to a particular PWS message. However, as security information may have a size ranging from dozens scores of bytes to hundreds of bytes, it is desirable to avoid insertion of security information if possible. In FIG. 9, security information is treated as a selective field in the PWS message and UE operation is described differently according to presence or absence of security information.

Steps 905, 910 and 915 of FIG. 9 are identical respectively to steps 805, 810 and 815 of FIG. 8.

Referring to FIG. 9, at step 917, the UE checks whether the current PLMN is a PLMN designated for PWS message reception. The current PLMN may be a registered PLMN or selected PLMN. A field indicating a PLMN designated for PWS message reception may be present in a stable storage such as the USIM in the UE. If the designated field is set to "Yes" and the current PLMN is a home or equivalent PLMN, as the current PLMN is a PLMN designated for PWS message reception, the procedure proceeds to step 920. If the designated field is set to "No" and the current PLMN is a home or equivalent PLMN, as the current PLMN is not a PLMN designated for PWS message reception, the procedure proceeds to step 918.

At step 918, although PWS-related system information is present in the system information of the corresponding cell, the UE terminates the PWS reception procedure without reception of PWS-related system information.

At step 920, the UE receives PWS-related system information. SIB 10 and SIB 11 are examples of PWS-related system information. SIB 10 may be used to notify occurrence of an emergency situation, and may include an emergency type indicator (earthquake or tidal wave), and PWS message identifier and serial number. The UE may identify repeatedly received PWS messages using the message identifier and serial number.

SIB 11 may include a more detailed emergency description such as an evacuation direction or media clip on the emergency situation. In view of importance, it is preferable to insert security information in SIB 10. The UE may receive both SIB 10 and SIB 11 or receive SIB 10 first at step 920, and proceed to step 923.

At step 923, the UE checks whether security information is contained in SIB 10. If security information is not contained, the procedure proceeds to step 930 at which the UE performs necessary operations and displays contents of the PWS message to the user. If security information is contained, the procedure proceeds to step 925 at which the UE checks whether to apply a security procedure. In other words, when a PWS message not containing security information is received from a network designated for PWS message reception, the UE processes the PWS message first without consideration of the option for handling unsecure PWS messages.

Steps 925, 930, 935, 940 and 945 of FIG. 9 are identical respectively to steps 825, 830, 835, 840 and 845 of FIG. 8.

When new PWS information is posted or PWS information is changed, a UE camping on a cell must promptly recognize this. When new PWS information is posted or PWS information is changed, the ENB broadcasts a paging message whose designated field is set to a preset value for a given time. Upon reception of such a paging message, the UE initiates a procedure to acquire PWS information.

Figure 10:
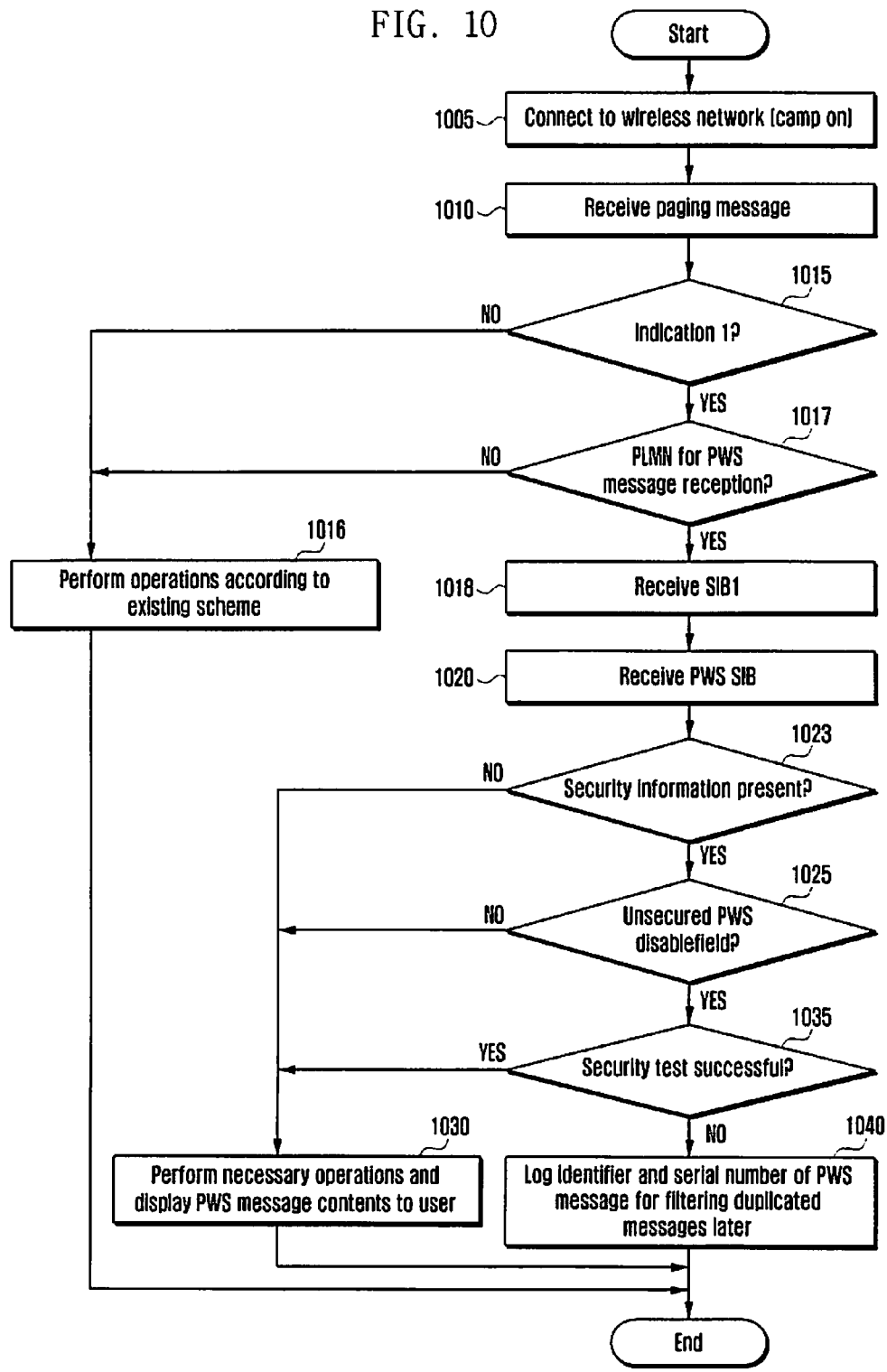
FIG. 10 illustrates another UE operation for PWS message reception.

FIG. 10 illustrates UE operation for receiving a paging message from the ENB.

Step 1005 is identical to step 905 of FIG. 9.

Referring to FIG. 10, at step 1010, the UE receives a paging message from the ENB. A paging message may be used to page a specific UE or to provide common information such as modified system information to multiple unspecified UEs. To notify PWS information modification to UEs, the ENB may broadcast a paging message containing a preset indication (hereinafter, referred to as "Indication 1"). The ENB repeatedly transmits a paging message containing Indication 1 for a period of time long enough to encompass paging times of all UEs within the cell, thereby permitting all UEs within the cell to recognize generation/modification of PWS messages.

Upon reception of a paging message, the UE checks whether Indication 1 is contained in the paging message. Indication 1 is an indicator to modification of PWS information. If Indication 1 is contained, the procedure proceeds to step 1017. If Indication 1 is not contained, the procedure proceeds to step 1016 at which the UE performs operations according to the existing process.

At step 1017, the UE checks whether the current PLMN is a PLMN permitting PWS message reception. A storage unit such as the USIM may provide two PLMN-related fields as follows.

field 1: indicates whether to receive a PWS message from the home or equivalent PLMN or to ignore.

field 2: indicates whether to receive a PWS message from a visited (or roamed) PLMN or to ignore.

The UE may determine whether to receive a PWS message from the current PLMN on the basis of the field 1 and field 2 values. For example, when the current PLMN is a visited PLMN, if field 2 indicates "receive", the current PLMN is a PLMN permitting PWS message reception; and if field 2 indicates "ignore", the current PLMN is a PLMN not permitting PWS message reception.

If the current PLMN is a PLMN not permitting PWS message reception, the procedure proceeds to step 1016 at which the UE performs operations according to the existing process without initiating PWS message reception. In most cases, PWS message reception is performed by a lower layer unit of the UE and PWS message processing is performed by a higher layer unit according to PLMN types or settings. Hence, when the ENB transmits a PWS message, a UE capable of PWS message reception receives the PWS message first and forwards the same to the higher layer unit. This causes a problem of receiving a PWS message that will not be notified to the user.

In the present invention, to address the above problem, PLMN types or settings are examined in advance at the time of PWS message reception, so that a PWS message that will not be notified to the user is not received.

If the current PLMN is a PLMN permitting PWS message reception, the procedure proceeds to step 1018 at which the UE receives SIB 1. The UE identifies scheduling of PWS-related system information from SIB 1 and monitors the downlink control channel for a given period of time to detect PWS-related SIBs.

At step 1020, the UE receives PWS-related SIBs. Step 1020 is substantially identical to step 920 of FIG. 9.

Steps 1023, 1025 and 1030 of FIG. 10 are identical respectively to steps 923, 925 and 930 of FIG. 9.

At step 1035, the UE checks whether the received PWS message is secure. If the PWS message has passed security test or integrity test, the procedure proceeds to step 1030. If the PWS message containing security information has failed in security test, as it is highly probable that the PWS message is a message sent by a malicious third party such as a hacker, the procedure proceeds to step 1040.

At step 1040, the UE discards the PWS message without presenting the same to the user and logs the identifier and serial number of the PWS message. Later, when a PWS message whose identifier/serial number is identical to a logged identifier/serial number is received, the PWS message is processed according to a normal process instead of being filtered as a duplicated message.

In other words, PWS messages that are discarded without being notified to the user because of failure in security test are treated differently from other PWS messages when duplicated. To be more specific, when a PWS message is received, the UE compares the identifier and serial number of the received PWS message with a stored log of identifiers and serial numbers of previously received PWS messages to check duplication. If the received PWS message is a duplicated message, the UE checks whether the corresponding previously received PWS message failed in security test. If the previously received PWS message did not failed in security test (success in security test passed or security test not performed), the UE discards the newly received PWS message on the ground of duplication. If the previously received PWS message failed in security test, the newly received PWS message is processed according to a normal process without being treated as a repeatedly received message.

Third Embodiment

Discussions are underway to introduce a new type of carrier to LTE release 12. This is to increase spectrum efficiency by reducing inherent inefficiency of existing carriers, such as frequent transmission of system information and Cell Reference Signals (CRS).

The new carrier does not provide system information. The UE may receive system information for the new carrier through a carrier associated with the new carrier. For ease of description, a new type of carrier not transmitting system information is referred to as a new carrier, and a carrier that is associated with a new carrier to provide necessary information is referred to as a reference carrier. In the following description, the words "carrier" and "cell" may be used interchangeably.

To provide system information for a new carrier by use of a common control signal or dedicated control signal of a reference carrier, a scheme that enables the reference carrier to provide the System Frame Number (SFN) of the new carrier is needed.

In the LTE mobile communication system, the SFN is used as a criterion for communication between the UE and ENB. Most operations are successfully executed when the UE and ENB use the same SFN. For example, as the transmission time of a Sounding Reference Signal (SRS) is set on the basis of the SFN, when the UE and ENB use different SFNs, SRS transmission and reception is not properly performed.

When time synchronization between the new carrier and reference carrier is established (i.e. radio frame boundaries of the two carriers or serving cells are coincide), a UE having achieved time synchronization with the reference carrier does not have to establish time synchronization with the new carrier. For ease of description, the new carrier time-synchronized with the reference carrier is referred to as a synchronized new carrier or a synchronized new type cell.

Although a synchronized new carrier is more efficient than a non-synchronized new carrier, it may be virtually impossible to establish exact synchronization of a new carrier according to network conditions. For ease of description, a new carrier not time-synchronized with an adjacent carrier is referred to as a non-synchronized new carrier or a non-synchronized new type cell.

In the event that a UE accesses a synchronized new type cell, when the SFN of the synchronized new type cell is set to that of the reference carrier cell (reference cell), no problem occurs as the UE and ENB assume the same SFN.

When a UE accesses a non-synchronized new carrier cell, a problem may occur as the radio frame of the non-synchronized new carrier cell does not coincide with that of the reference cell.

Figure 11:
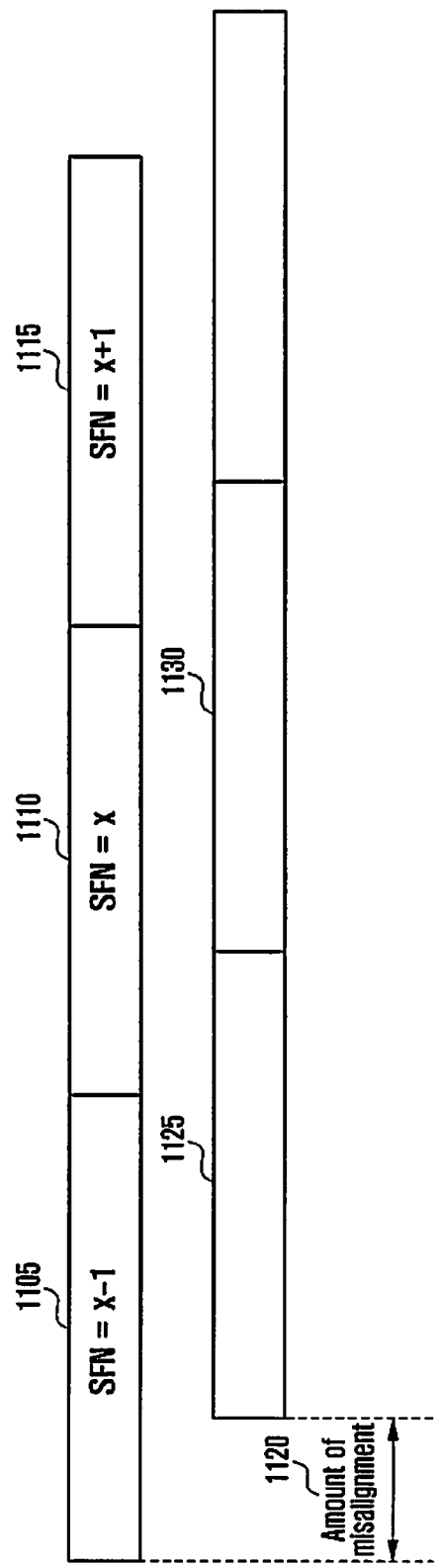
FIG. 11 illustrates frame timing of a non-synchronized new type cell.

FIG. 11 illustrates a non-synchronized new carrier. Referring to FIG. 11, the frame boundaries of the reference cell and non-synchronized new type cell do not coincide and are misaligned by an amount indicated by reference numeral 1120. Here, the radio frame of the reference cell whose SFN is x overlaps two radio frames 1125 and 1130 of the non-synchronized new type cell. Hence, it is necessary to determine which of the two radio frames 1125 and 1130 will have SFN=x.

In the present invention, the ENB provides explicit information to the UE so that the SFN of a non-synchronized new type cell may be specified.

Explicit information provided by the ENB is 1 bit and may indicate one of the two cases below.
- 0: the radio frame of the new type cell that does not precede the radio frame with SFN=x of the reference cell and is nearest thereto will have SFN=x (e.g. SFN of radio frame 1130 is x).
- 1: the radio frame of the new type cell that does not follow the radio frame with SFN=x of the reference cell and is nearest thereto will have SFN=x (e.g. SFN of radio frame 1125 is x).

When the amount of misalignment is very small, the ENB may not know whether the radio frames of the new serving cell will precede or follow the radio frames of the reference serving cell. In this case, the ENB may not provide the above information and may designate the radio frame of the new type cell having the largest overlap with the radio frame with SFN=x of the reference cell to have SFN=x (e.g. SFN of radio frame 1130 is x).

Figure 12:
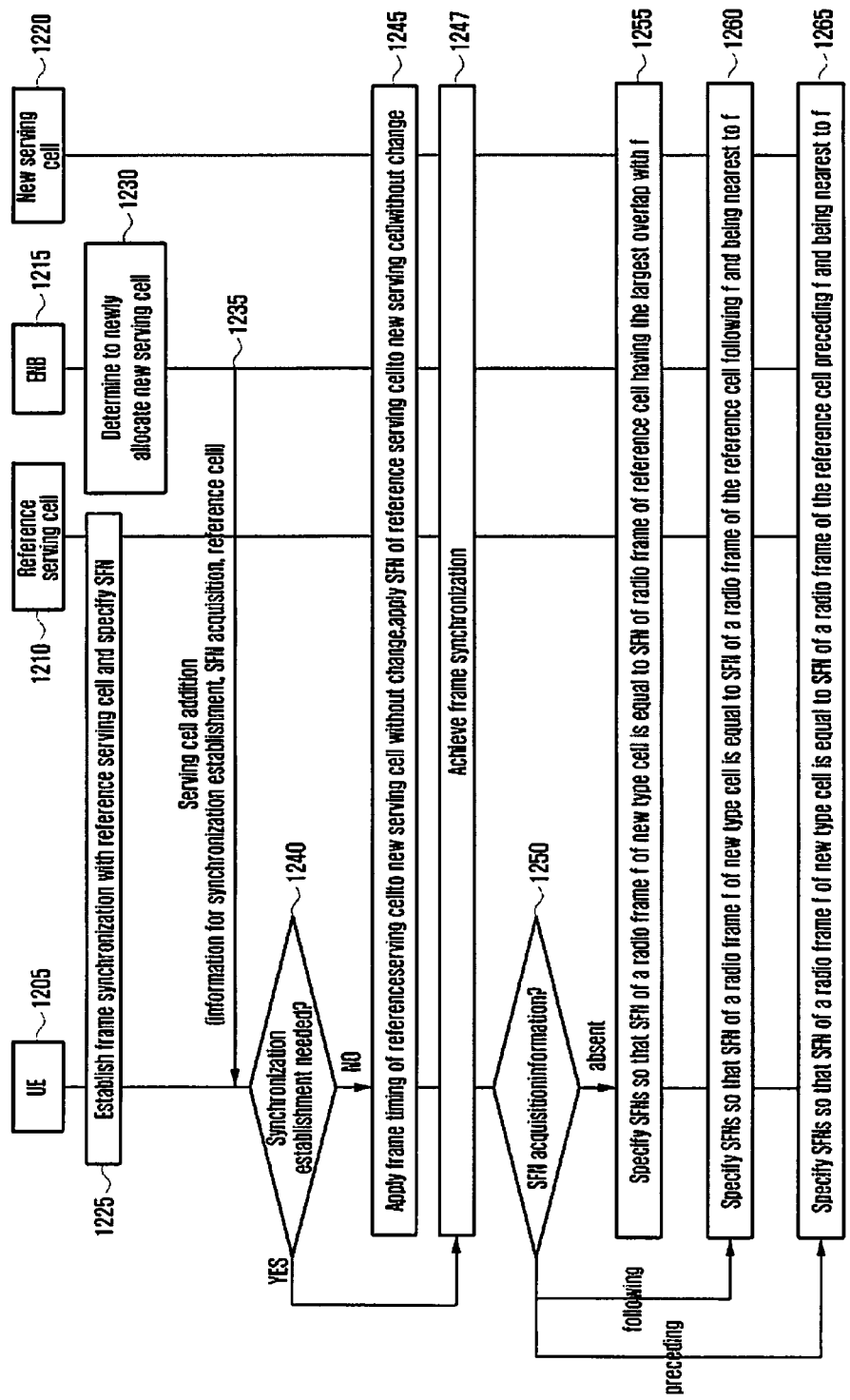
FIG. 12 illustrates a procedure for obtaining the SFN of a new type cell.

FIG. 12 illustrates an overall procedure for determining the SFN of a new type cell.

Referring to FIG. 12, at step 1225 the UE 1205 establishes synchronization with a cell 1210 of the ENB 1215 and specifies radio frames with SFN. The UE establishes synchronization with a cell through cell search. Cell search and synchronization are described in 3GPP TS 36.213 (section 4).

During synchronization, the UE receives a Primary Synchronization Signal (PSS) and a Secondary Synchronization Signal (SSS) from a cell exhibiting a channel quality level exceeding a preset threshold and recognizes frame boundaries using the synchronization signals. The UE receives system information from the cell and identifies the SFN specifying radio frames by use of SFN information contained in the Master Information Block (MIB) of the system information. The UE and ENB establish RRC connections through a serving cell and perform uplink data transmission and downlink data transmission.

At step 1230, the ENB determines to allocate a new serving cell to the UE or determines to hand over the UE. In particular, if the UE is located in a region of a new type cell, the ENB may determine to allocate a new type cell to the UE or determine to hand over the UE to a new type cell.

At step 1235, the ENB sends a control message indicating serving cell addition or handover to the UE. The control message contains information on a serving cell to be added (or to be the target for handover), such as information related to the cell identifier, center frequency, radio transmission resources. When the serving cell to be added (or to be the target for handover) is a new type cell, the following information may be further included.

information for synchronization establishment
information for SFN acquisition
information on the reference cell The above information may be delivered as follows according to the type of the serving cell to be added (or to be the target for handover).

1. When the New Serving Cell is a Regular Cell
   information for synchronization establishment, information for SFN acquisition and reference cell information are all not included.
   when all the above three pieces of information are absent, the UE recognizes that the serving cell to be added (or to be the target for handover) and applies an existing procedure for serving cell addition (or handover). For example, for handover, the UE may establish synchronization with the new serving cell and receive MIB of the new serving cell to specify frame numbers.

2. When the New Serving Cell is a Synchronized New Type Cell
   information for synchronization establishment and reference cell information may be included.
   the information for synchronization establishment indicates no need for synchronization establishment.
   the reference cell information indicates information on a reference cell (such as cell identifier) that is used by the UE to specify frame numbers of the new cell. In the case of handover, the source cell becomes the reference cell by default.

3. When the New Serving Cell is a Non-Synchronized New Type Cell
   information for synchronization establishment, information for SFN acquisition and reference cell information may be included.
   the information for synchronization establishment indicates a need for synchronization establishment.
   the information for SFN acquisition indicates one of "preceding" and "following".
   the reference cell information indicates information on a reference cell (such as cell identifier) that is used by the UE to specify frame numbers of the new serving cell. In the case of handover, the source cell becomes the reference cell by default.

At step 1240, the UE checks necessity of synchronization establishment on the basis of the information for synchronization establishment in the control message. If the information for synchronization establishment indicates no need for synchronization establishment, the procedure proceeds to step 1245. If the information for synchronization establishment indicates a need for synchronization establishment, the procedure proceeds to step 1247.

At step 1245, the UE does not attempt to receive the PSS/SSS of the new serving cell, applies the frame timing of the reference cell to the new serving cell without modification, and applies the SFN of the reference cell to the new serving cell without modification. Thereafter, the procedure is ended.

At step 1247, the UE receives the PSS/SSS of the new serving cell to achieve frame synchronization. When frame synchronization with the new serving cell has been achieved before, step 1247 may be skipped.

At step 1250, the UE examines information for SFN acquisition. If the information for SFN acquisition is not included (i.e. synchronization is necessary but SFN acquisition information is not included), the procedure proceeds to step 1255. If the information for SFN acquisition indicates "following", the procedure proceeds to step 1260. If the information for SFN acquisition indicates "preceding", the procedure proceeds to step 1265.

At step 1255, the UE specifies SFNs of radio frames of the new serving cell so that the SFN of a radio frame f of the new type cell is equal to that of a radio frame of the reference cell having the largest overlap with f on the time axis.

At step 1260, the UE specifies SFNs of radio frames of the new serving cell so that the SFN of a radio frame f of the new type cell is equal to that of a radio frame of the reference cell following f and being nearest to f.

At step 1265, the UE specifies SFNs of radio frames of the new serving cell so that the SFN of a radio frame f of the new type cell is equal to that of a radio frame of the reference cell preceding f and being nearest to f.

Figure 13:
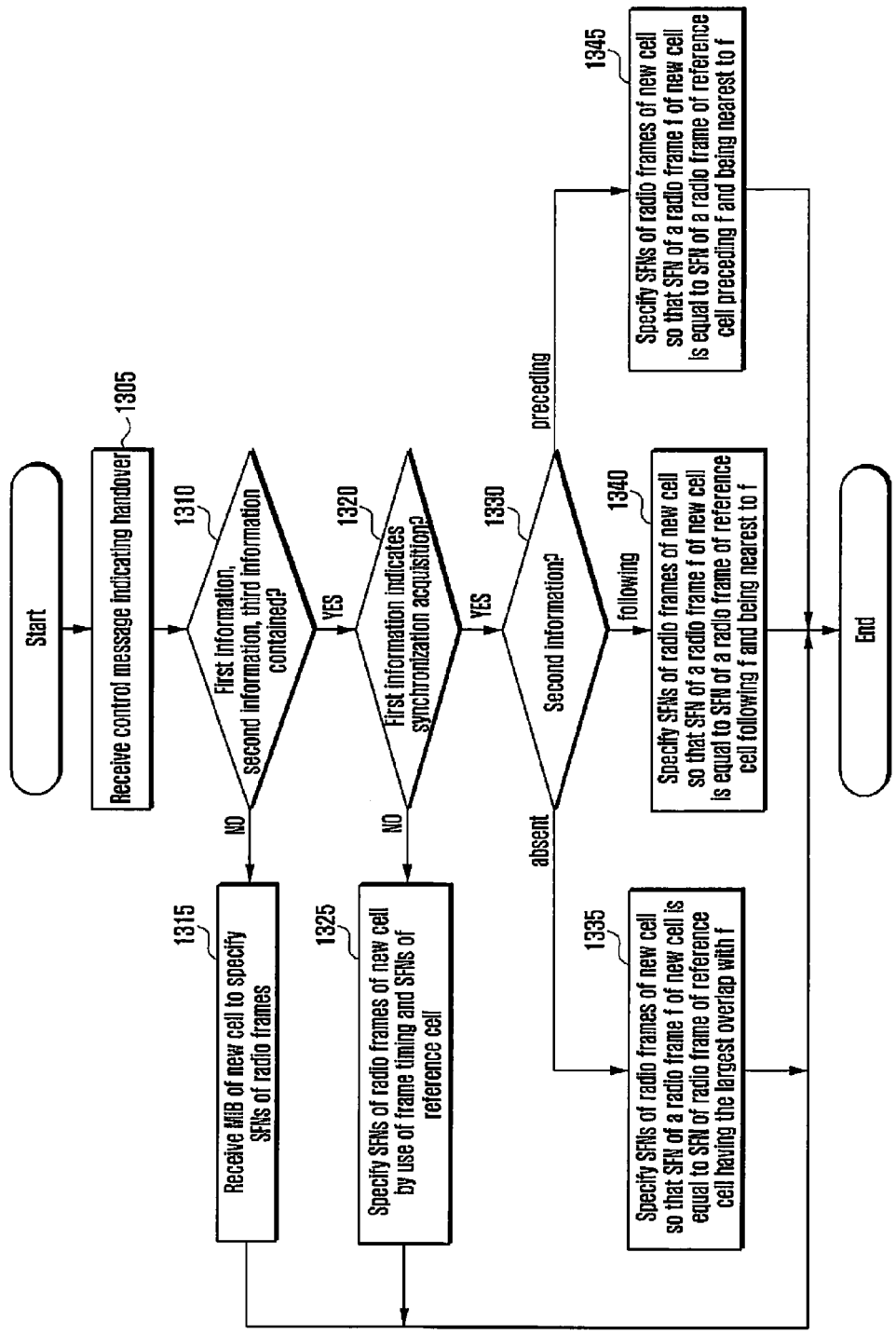
FIG. 13 illustrates a procedure for obtaining the SFN performed by a UE being handed over to a new type cell.

FIG. 13 illustrates a procedure for obtaining the SFN of a new type cell when the UE performs handover.

Referring to FIG. 13, at step 1305, the UE receives a control message indicating handover from the ENB.

At step 1310, the UE checks whether first information (for synchronization), second information (for SFN acquisition) and third information (on reference cell) are contained in the control message. If no such information is included (handover to regular serving cell), the procedure proceeds to step 1315. If at least the first information is included (handover to new type cell), the procedure proceeds to step 1320.

At step 1315, the UE establishes synchronization with the new cell, performs random access, receives MIB of the target cell, and recognizes SFNs of radio frames of the new cell.

At step 1320, the UE examines the first information to identify necessity of synchronization with the new cell. If synchronization is not needed (i.e. the new cell is a synchronized new type cell), the procedure proceeds to step 1325. If synchronization is needed (i.e. the new cell is a non-synchronized new type cell), the procedure proceeds to step 1330.

At step 1325, the UE specifies frame timing by use of frame timing of the reference cell indicated by the third information, and recognizes SFNs of the new cell by use of SFNs of the reference cell. When the third information is not present, the reference cell is the source cell (previous cell).

At step 1330, the UE examines the second information. If the second information is not present, the procedure proceeds to step 1335. If the second information indicates "following", the procedure proceeds to step 1340. If the second information indicates "preceding", the procedure proceeds to step 1345.

At step 1335, the UE receives the PSS/SSS of the new cell to achieve frame timing, and specifies SFNs of radio frames of the new cell so that the SFN of a radio frame f of the new cell is equal to that of a radio frame of the reference cell having the largest overlap with f on the time axis.

At step 1340, the UE receives the PSS/SSS of the new cell to achieve frame timing, and specifies SFNs of radio frames of the new cell so that the SFN of a radio frame f of the new cell is equal to that of a radio frame of the reference cell following f and being nearest to f.

At step 1345, the UE receives the PSS/SSS of the new cell to achieve frame timing, and specifies SFNs of radio frames of the new cell so that the SFN of a radio frame f of the new cell is equal to that of a radio frame of the reference cell preceding f and being nearest to f.

To make a determination on handover or serving cell addition, the ENB has to maintain information on channel states of the UE. To obtain such information, the UE directs the UE to perform various measurements. RRM measurement is measurement performed for radio resource management.

Measurement of strength and quality of Cell Reference Signals (CRS) for the current and neighbor cells is a representative example of RRM measurement. The UE reports measured signal strength/quality levels to the ENB, which then makes RRM determinations on the basis of measurement reports.

CRS transmission is performed at each subframe in a regular cell. On the other hand, the frequency of CRS transmission is reduced to decrease overhead in a new type cell. For example, CRS transmission may be performed once every five subframes in a new type cell. In the following description, "CRS pattern" refers to a pattern of subframes at which CRS transmission is performed. As a single CRS pattern in which CRS transmission is performed at each subframe is present in a regular cell, it is not necessary to notify a CRS pattern when a measurement direction is issued for a regular cell.

However, as various CRS patterns may be present in a new type cell, it is necessary to provide CRS pattern information for each new type cell. The present invention provides a scheme that delivers CRS pattern information to the UE when the ENB configures measurement objects in the UE.

Figure 14:
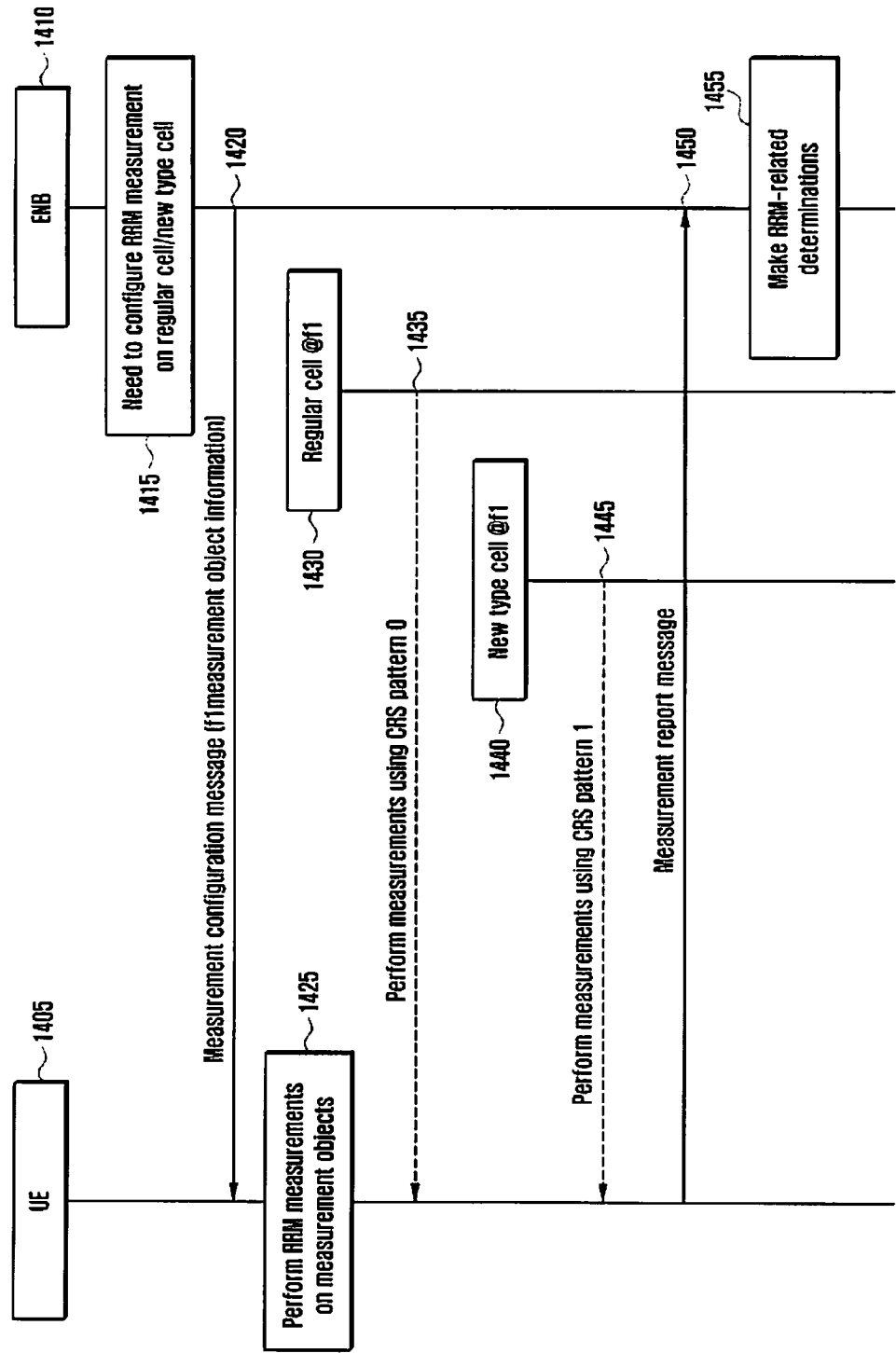
FIG. 14 illustrates a procedure for measuring a new type cell.

FIG. 14 illustrates an overall procedure whereby the ENB provides CRS pattern information to the UE.

Referring to FIG. 14, at step 1415, the ENB 1410 determines to configure RRM measurement for the ENB 1405 at a suitable point in time. For example, a need to configure an additional serving cell or to direct handover occurs.

At step 1420, the ENB sends a measurement configuration message containing measurement object information and the like to the UE. Measurement objects may be configured on a carrier basis, and measurement object information may include carrier frequency information and SCell measurement cycle information (measCycleSCell). Here, measCycleSCell indicates a measurement cycle applied when SCell of the corresponding carrier is deactivated to reduce UE battery consumption.

When a new type cell is present in the carrier to be measured, the flowing information may be further sent.

Information on the New Type Cell
CRS pattern information of the new type cell
PCI information of the new type cell
offset information to be applied to the new type cell
SCell measurement cycle information to be applied to the new type cell Here, CRS pattern information may be configured on a PCI (physical cell ID, integer between 0 to 503) basis. A CRS pattern represents a form of repeated CRSs in a time-frequency grid. In a regular cell, CRSs are transmitted over all frequencies of all subframes. For a cell whose CRS pattern is not explicitly specified, this default pattern is assumed.

In a new type cell, to reduce CRS overhead, CRS transmission is performed only at selected frequencies of some subframes. CRS pattern information indicates frequency resources of subframes through which CRS transmission is performed. CRS pattern information may include subframe numbers and frequency resource information, or include an index to one of CRS patterns.

Examples of CRS pattern indexes are listed in Table 1.

TABLE 1

| CRS pattern index | CRS transmission cycle (subframes) | Number of subframe in which CRS is sent | Transmission frequency resource |
|---|---|---|---|
| 0 | 1 subframe (1 ms) | all subframes | all frequencies |
| 1 | 2 subframes (5 ms) | #0, #5 | all frequencies |
| 2 | 10 subframes (10 ms) | #1 | 6 PRBs (Physical Resource Block) around center frequency |
| ... | ... | ... | ... |

At the beginning of usage of new type cells, the number of CRS patterns may be limited. When only one CRS pattern is defined, it may be possible to know the CRS pattern to use by just indicating presence of a new type cell without separately specifying CRS pattern information.

In a carrier, regular cells and new type cells may coexist. In this case, PCIs of new type cells are explicitly indicated. When PCIs of new type cells are consecutively allocated, information reduction may be achieved by specifying a range of PCIs. For example, a range of PCIs of new type cells may be specified by the first PCI and the number of PCIs.

When PCI information is not present in new type cell information, this indicates that all cells of the corresponding carrier are a new type cell.

The UE measures a measurement object and compares a measured value with a preset reference value. Here, an offset may be added to or subtracted from the measured value to thereby adjust the measurement reporting condition. In particular, when downlink transmit output of a new type cell is lower than that of a regular cell, a negative offset may be applied, so that measurement results for the regular cell can be compared with those for the new type cell under comparable conditions.

It may be necessary for a new type cell to have a different SCell measurement cycle from a regular cell. This is because CRS transmission is performed in all subframes of a regular cell while CRS transmission is performed in some subframes of a new type cell. When a new type cell is included as a measurement object, a first SCell measurement cycle and a second SCell measurement cycle may be configured. The UE may apply the two SCell measurement cycles as follows.

- when the first and second SCell measurement cycles are both signaled, the UE applies the first SCell measurement cycle to a regular cell and applies the second SCell measurement cycle to a new type cell.
- when only the first SCell measurement cycle is signaled (i.e. the second SCell measurement cycle is not included in the new type cell information), the UE applies the first SCell measurement cycle to both a regular cell and a new type cell. Or, the first SCell measurement cycle may be used as the second SCell measurement cycle.

Upon reception of the measurement configuration message, at step 1425, the UE performs measurements on the measurement objects. Specifically, at step 1435, the UE applies a preset CRS pattern (e.g. Pattern 0) to perform measurements on a regular cell 1430. At step 1445, the UE applies a signaled CRS pattern (e.g. Pattern 1) to perform measurements on a new type cell 1440.

Application of Pattern 1 indicates that CRS measurement is performed only at a specific time/frequency of a subframe in which CRS transmission is performed through preset frequency resources as specified by CRS pattern 1.

If the measurement result satisfies a preset reporting condition, at step 1450, the UE sends a measurement report message to the ENB. At step 1455, the ENB makes RRM-related determinations in consideration of reported measurement results.

Figure 15:
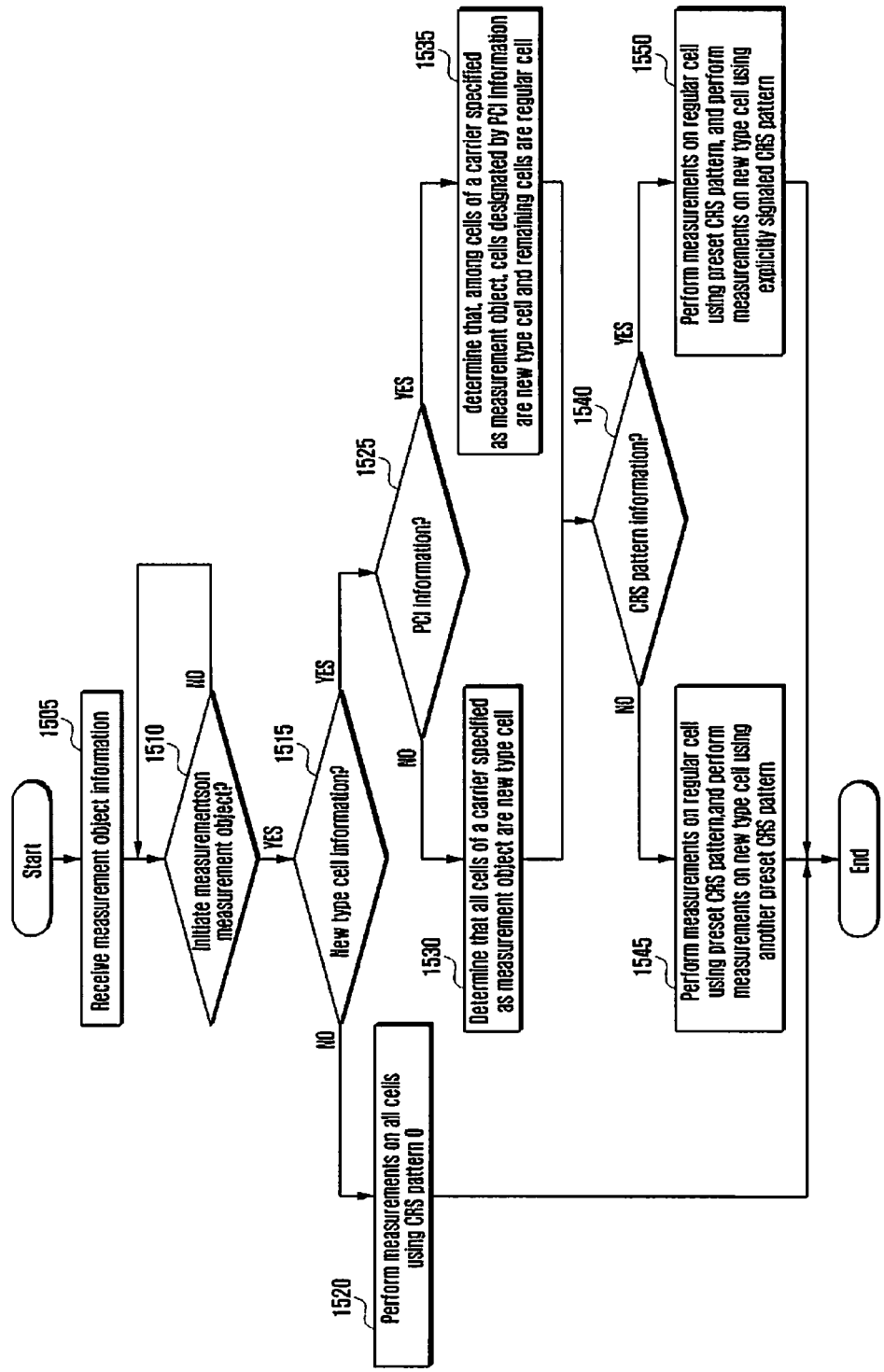
FIG. 15 illustrates UE operation for determining the CRS pattern of a new type cell.

FIG. 15 illustrates UE operation in relation to a CRS pattern.

Referring to FIG. 15, at step 1505, the UE receives a control message containing measurement object information from the ENB.

At step 1510, the UE checks satisfaction of a measurement initiation condition for the measurement object. If the measurement initiation condition is satisfied, the procedure proceeds to step 1515. Otherwise, the UE waits for satisfaction of the measurement initiation condition. Measurements on a measurement object are initiated only when a preset condition is satisfied. For example, in the event that the measurement object is not a serving carrier (or serving carrier), measurements may be initiated only when channel quality of the serving cell becomes lower than a preset threshold.

At step 1555, the UE checks whether new type cell information is contained in the measurement object information. Here, new type cell information indicates at least one of an indicator to presence of a new type cell in the corresponding carrier, PCI information of the new type cell, and CRS pattern information of the new type cell.

If new type cell information is not contained, the procedure proceeds to step 1520 at which the UE performs measurements on all cells specified as a measurement object (or on all PCIs of a carrier specified as a measurement object) by use of a preset CRS pattern (e.g. CRS pattern #0).

If new type cell information is contained, the procedure proceeds to step 1525 at which the UE checks whether new type cell PCI information is contained. If new type cell PCI information is contained, the procedure proceeds to step 1535. Otherwise, the procedure proceeds to step 1530.

At step 1530, the UE determines that all cells (or all PCIs) of a carrier (or frequency) specified as a measurement object are a new type cell. The procedure proceeds to step 1540.

At step 1535, the UE determines that, among cells of a carrier specified as a measurement object, cells designated by PCI information are a new type cell and the remaining cells are a regular cell. The procedure proceeds to step 1540.

At step 1540, the UE checks whether CRS pattern information is contained. If CRS pattern information is contained, the procedure proceeds to step 1550. Otherwise, the procedure proceeds to step 1545.

At step 1545, the UE performs measurements on a regular cell by use of a preset CRS pattern (e.g. CRS pattern #0) and performs measurements on a new type cell by use of another preset CRS pattern (e.g. CRS pattern #1).

At step 1550, the UE performs measurements on a regular cell by use of a preset CRS pattern (e.g. CRS pattern #0) and performs measurements on a new type cell by use of an explicitly signaled CRS pattern.

Although CRS measurement is depicted in FIGS. 14 and 15, measurements may be performed using another reference signal such as Channel State Information-Reference Signal (CSI-RS). In this case, measurements on a regular cell may be performed using CRS pattern #0, and measurements on a new type cell may be performed using a preset CSI-RS pattern. Alternatively, measurements on a regular cell and measurements on a new type cell may be performed using different CSI-RS patterns.

Figure 16:
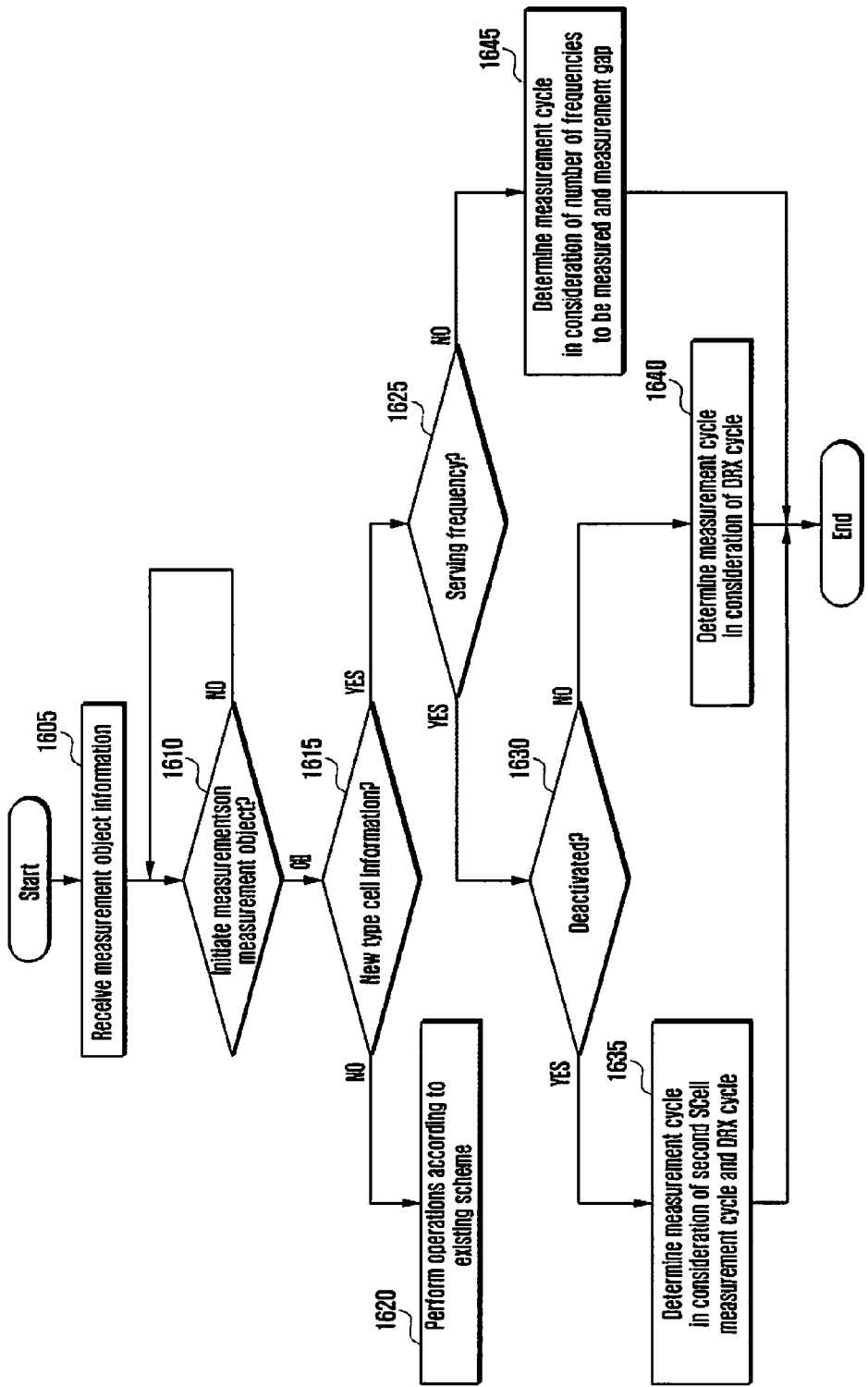
FIG. 16 illustrates UE operation for determining the measurement cycle of a new type cell.

FIG. 16 illustrates UE operation for determining the measurement cycle.

Step 1605 and step 1610 of FIG. 16 are identical respectively to step 1505 and step 1510 of FIG. 16.

At step 1615, the UE checks whether new type cell information is contained in the measurement object information. Here, new type cell information indicates at least one of an indicator to presence of a new type cell in the corresponding carrier, PCI information of the new type cell, and CRS pattern information of the new type cell.

If new type cell information is not contained, the procedure proceeds to step 1620 at which the UE determines a measurement cycle according to an existing scheme. If new type cell information is contained, the procedure proceeds to step 1625.

At step 1625, the UE examines whether the carrier specified as a measurement object is a serving frequency (in other words, a serving cell is configured in the carrier specified as a measurement object). If a serving frequency, the procedure proceeds to step 1630. If not a serving frequency, the procedure proceeds to step 1645.

At step 1630, the UE checks whether the serving cell configured in the carrier specified as a measurement object is activated. If activated, the procedure proceeds to step 1640. If not activated, the procedure proceeds to step 1635.

SCell activation/deactivation is determined by a MAC layer control message or a timer. The UE does not perform scheduling channel reception or data reception for a deactivated serving cell, reducing battery consumption.

At step 1635, the UE determines the measurement cycle in consideration of the second SCell measurement cycle and DRX cycle. More specifically, the UE sets the measurement cycle to a longer one of the DRX cycle and second SCell measurement cycle. When only the first SCell measurement cycle is set or signaled while the second SCell measurement cycle is not signaled, the UE may use the first SCell measurement cycle as the second SCell measurement cycle. When neither the first SCell measurement cycle nor the second SCell measurement cycle is signaled, the UE may use the DRX cycle as the second SCell measurement cycle. When neither the first SCell measurement cycle nor the second SCell measurement cycle is signaled and the DRX cycle is not set, the UE may use a preset time value (e.g. 40 ms) as the second SCell measurement cycle.

At step 1640, the UE determines the measurement cycle in consideration of the DRX cycle. For example, the measurement cycle is set to the DRX cycle. When the DRX cycle is not set, the measurement cycle is set to a preset time value (e.g. 40 ms).

At step 1645, the UE determines the measurement cycle in consideration of the number of frequencies to be measured (the number of non-serving frequencies) excluding serving frequencies (frequencies at which PCell or SCell is configured). For example, the UE may set the measurement cycle to a time value obtained by multiplying the number of non-serving frequencies and a preset value together. The UE may also set the measurement cycle to a time value obtained by multiplying the number of frequencies containing a new type cell (among non-serving frequencies) and a preset value together.

Figure 17:
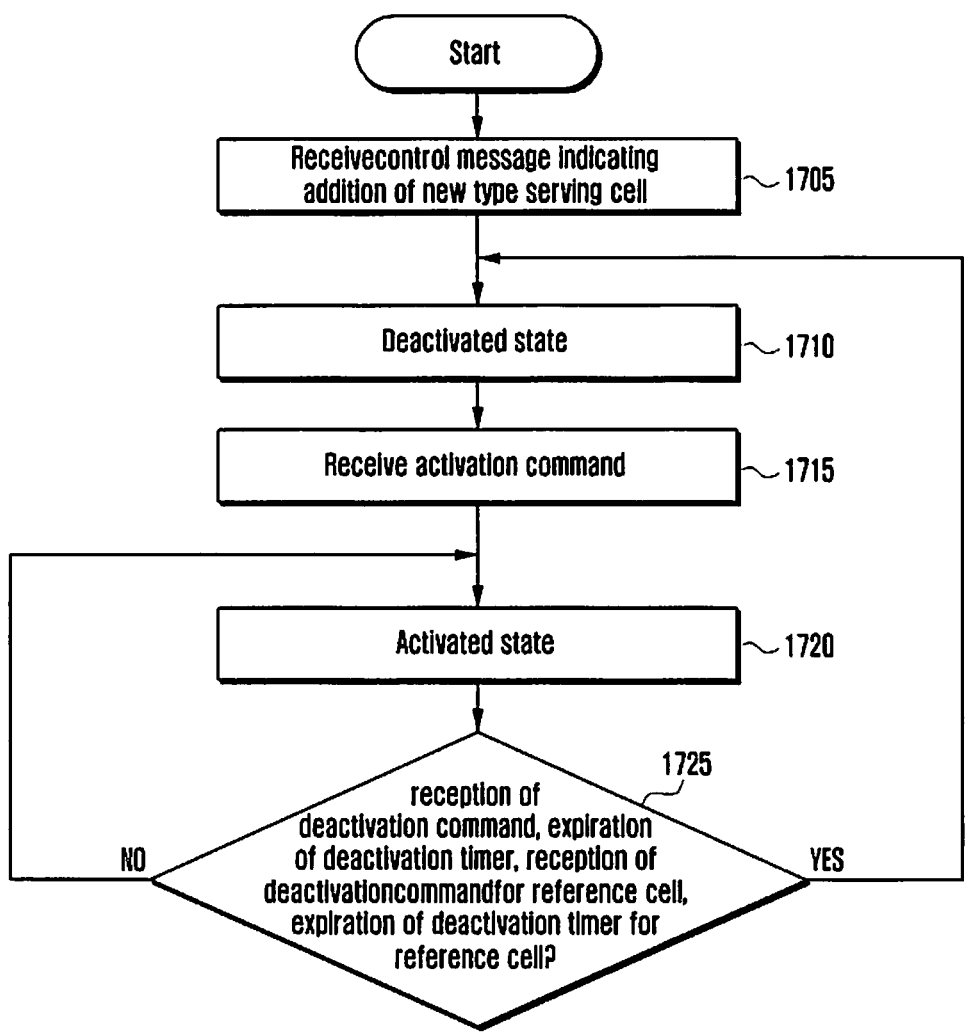
FIG. 17 illustrates UE operation for activating and deactivating a new type cell.

FIG. 17 illustrates UE operation for adding a new type cell as a serving cell.

Referring to FIG. 17, at step 1705, the UE receives a control message indicating addition of a new type serving cell. Here, the control message may be an RRC connection reconfiguration message. Information on a serving cell to be added (such as information on the center frequency and bandwidth of the serving cell to be added) is inserted in the message.

When the new serving cell is a new type serving cell, this information is also inserted. For example, a new type serving cell indication and a reference serving cell ID may be further included in the message. Here, a reference serving cell refers to a serving cell providing frame synchronization and SFN to the new type cell. When a reference serving cell ID is not included, PCell is used as a reference serving cell.

At step 1710, the UE receives a downlink signal from the new serving cell, configures physical layer and MAC layer settings for uplink signal transmission, and deactivates the new serving cell. The UE waits for receiving MAC control information indicating activation of the newly added serving cell.

At step 1715, the UE receives an activation command. At step 1720, the UE activates the serving cell. When a serving cell is activated, a UE may receive a downlink signal and send an uplink signal in the serving cell. The UE periodically sends channel quality information of the activated serving cell to the ENB. The UE monitors a scheduling event for the activated serving cell.

At step 1725, the UE checks whether the activated serving cell satisfies a deactivation condition while performing operations necessary for the activated serving cell. Examples of deactivation conditions are as follows.

reception of MAC control information indicating deactivation of the serving cell;
  expiration of a deactivation timer of the serving cell;
  for a new type serving cell, reception of MAC control information indicating deactivation of the reference serving cell; or
  for a new type serving cell, expiration of a deactivation timer of the reference serving cell.

The deactivation timer is used to prevent a serving cell from being in activated state for a long time, and is run for each serving cell. The UE starts the deactivation timer when a corresponding serving cell is activated, and restarts the deactivation timer when scheduling information (DL assignment or UL grant) for the serving cell is received. Expiration of the deactivation timer for a serving cell indicates that the serving cell has not been scheduled for a preset time, and causes the UE to deactivate the serving cell.

In the case of a new type serving cell, when the reference serving cell is deactivated, it becomes difficult to maintain frame timing. Hence, when the reference serving cell is deactivated, it is desirable to deactivate the new type serving cell as well.

Figure 18:
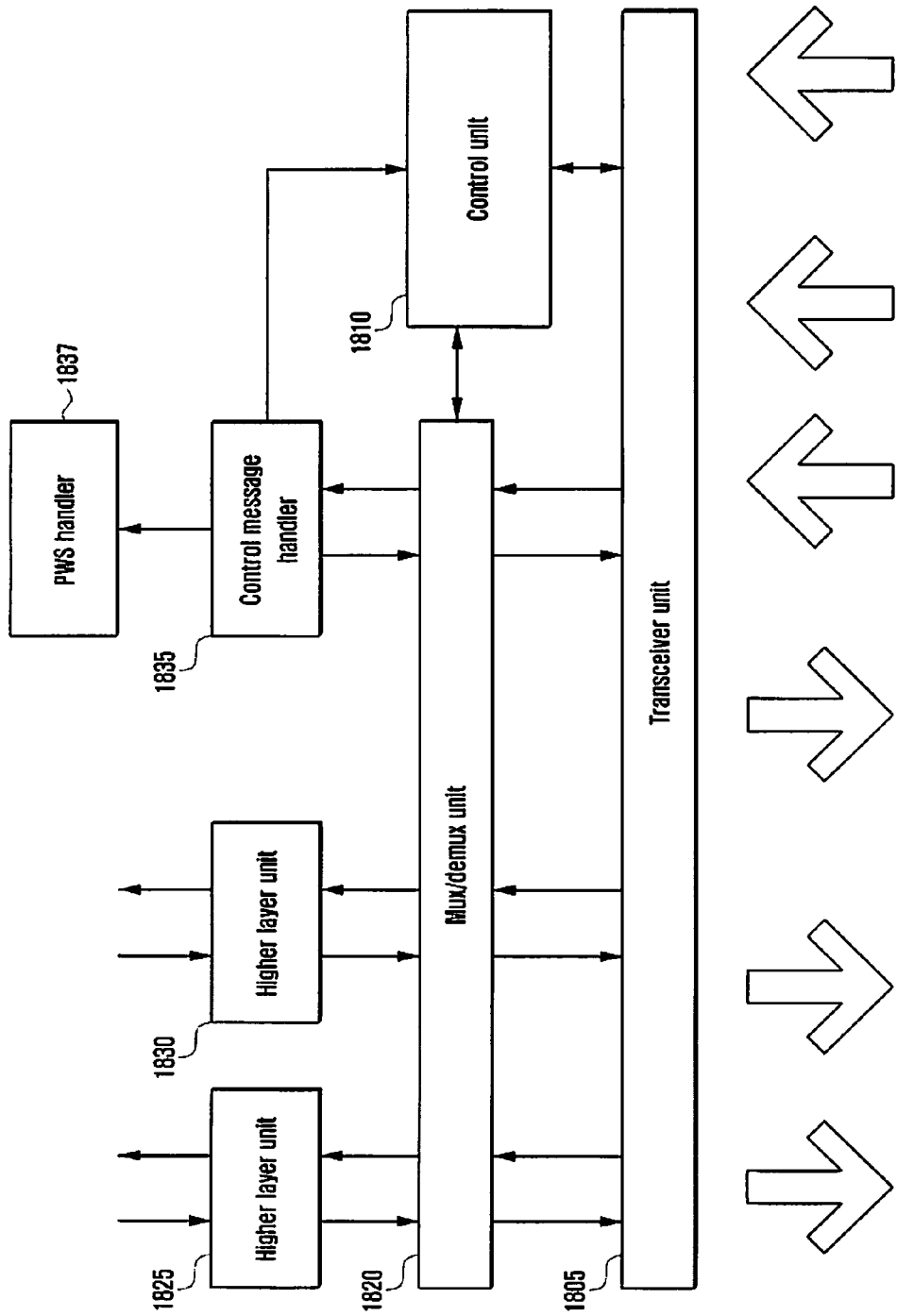
FIG. 18 illustrates a user equipment.

FIG. 18 is a block diagram of a user equipment (UE) according to an embodiment of the present invention.

Referring to FIG. 18, the user equipment may include a transceiver unit 1805, a control unit 1810, a mux/demux unit 1820, a control message handler 1835, various higher layer units 1825 and 1830, and a PWS handler 1837.

The transceiver unit 1805 receives data and control signals through downlink channels of a serving cell and sends data and control signals through uplink channels. When multiple serving cells are configured, the transceiver unit 1805 may send and receive data and control signals through the multiple serving cells.

The mux/demux unit 1820 multiplexes data coming from the higher layer units 1825 and 1830 or the control message handler 1835, and demultiplexes data received by the transceiver unit 1805 and forwards the demultiplexed data to the higher layer units 1825 and 1830 or the control message handler 1835.

The control message handler 1835 is an RRC layer entity that processes a control message received from a base station and performs a corresponding operation. For example, when RRC control messages are received, the control message handler 1835 forwards PHR information and new type cell information to the control unit 1810 and forwards PWS-related system information to the PWS handler 1837.

The higher layer units 1825 and 1830 may be configured on a service basis. The higher layer units 1825 and 1830 may process user data generated by service applications such as File Transfer Protocol (FTP) and Voice over Internet Protocol (VoIP) and forward the processed user data to the mux/demux unit 1820, and delivers data coming from the mux/demux unit 1820 to appropriate service applications at the higher layer.

The control unit 1810 examines scheduling commands such as uplink grants received through the transceiver unit 1805, and controls the transceiver unit 1805 and the mux/demux unit 1820 so that uplink transmissions are performed at proper timings with appropriate transmission resources. The control unit 1810 manages overall procedures related to power headroom reporting, PWS message reception, and new type cell handling. More specifically, the control unit 1810 controls overall UE operations described in FIGS. 6 to 17.

The PWS handler 1837 may discard PWS-related system information or deliver the same to the user interface under control of the control unit 1810.

Figure 19:
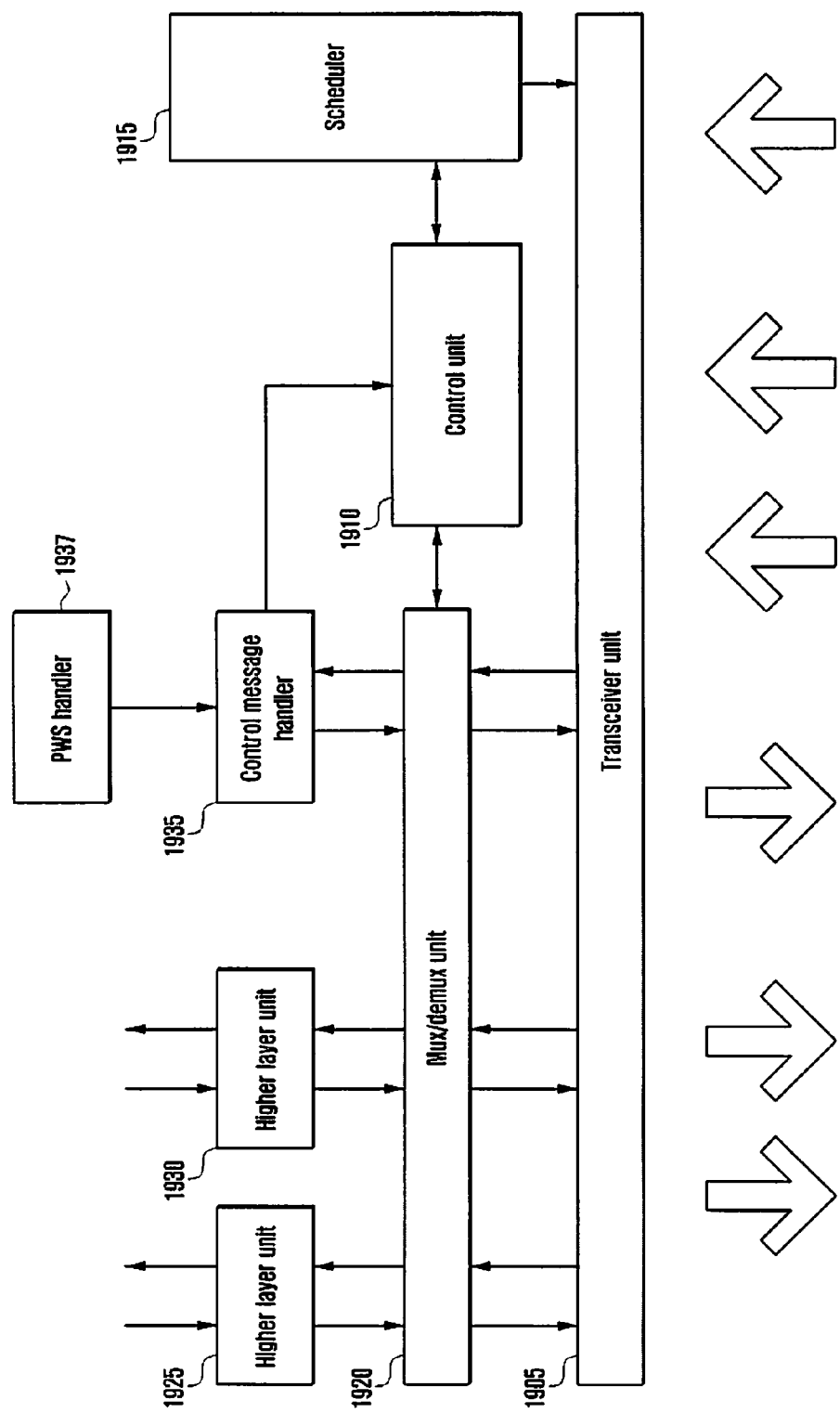
FIG. 19 illustrates a base station.

FIG. 19 is a block diagram of a base station (ENB) according to an embodiment of the present invention. Referring to FIG. 19, the base station may include a transceiver unit 1905, a control unit 1910, a mux/demux unit 1920, a control message handler 1935, various higher layer units 1925 and 1930, a scheduler 1915, and a PWS handler 1937.

The transceiver unit 1905 sends data and control signals through a downlink carrier and receives data and control signals through an uplink carrier. When multiple carriers are configured, the transceiver unit 1905 may send and receive data and control signals through the multiple carriers.

The mux/demux unit 1920 multiplexes data coming from the higher layer units 1925 and 1930 or the control message handler 1935, and demultiplexes data received by the transceiver unit 1905 and forwards the demultiplexed data to the higher layer units 1925 and 1930, the control message handler 1935 or the control unit 1910. The control message handler 1935 processes a control message received from a UE and performs a corresponding operation, and generates a control message to be sent to a UE and forwards the control message to a lower layer.

The higher layer units 1925 and 1930 may be configured on a bearer basis. The higher layer units 1925 and 1930 may compose RLC PDUs using data received from the S-GW or another ENB and forward the same to the mux/demux unit 1920, and compose PDCP SDUs using RLC PDUs coming from the mux/demux unit 1920 and send the same to the S-GW or another ENB.

The scheduler 1915 allocates transmission resources to a UE at appropriate points in time in consideration of buffer states and channel states, and controls the transceiver unit 1905 to send or receive a signal to or from the UE. The PWS handler 1937 performs operations related to transmission of a PWS message from a PWS server.

The control unit 1910 manages overall procedures related to SCell configuration, RRC connection configuration, and handover. More specifically, the control unit 1910 controls overall ENB operations in relation to UE operations described in FIGS. 6, 7, 11, 12, 13, 14, 15, 16 and 17, and controls ENB operations described in FIG. 19.

The control unit 1910 manages overall procedures related to power headroom reporting, PWS message reception, and new type cell handling. More specifically, the control unit 1910 controls overall ENB operations in relation to UE operations described in FIGS. 6 to 17, and controls ENB operations described in FIG. 19.

Next, another embodiment of the present invention is described. The following description is related to a power setting method and apparatus for a user equipment having a transmitter structure composed of multiple power amplifiers with different maximum transmit power values. The present invention relates to a wireless communication system. More particularly, the present invention relates to a transmit power setting method in a transmitter structure composed of multiple power amplifiers with different maximum transmit power values when carrier aggregation (CA) between carriers belonging to different frequency bands is employed in the Long Term Evolution (LTE) system.

Figure 20:
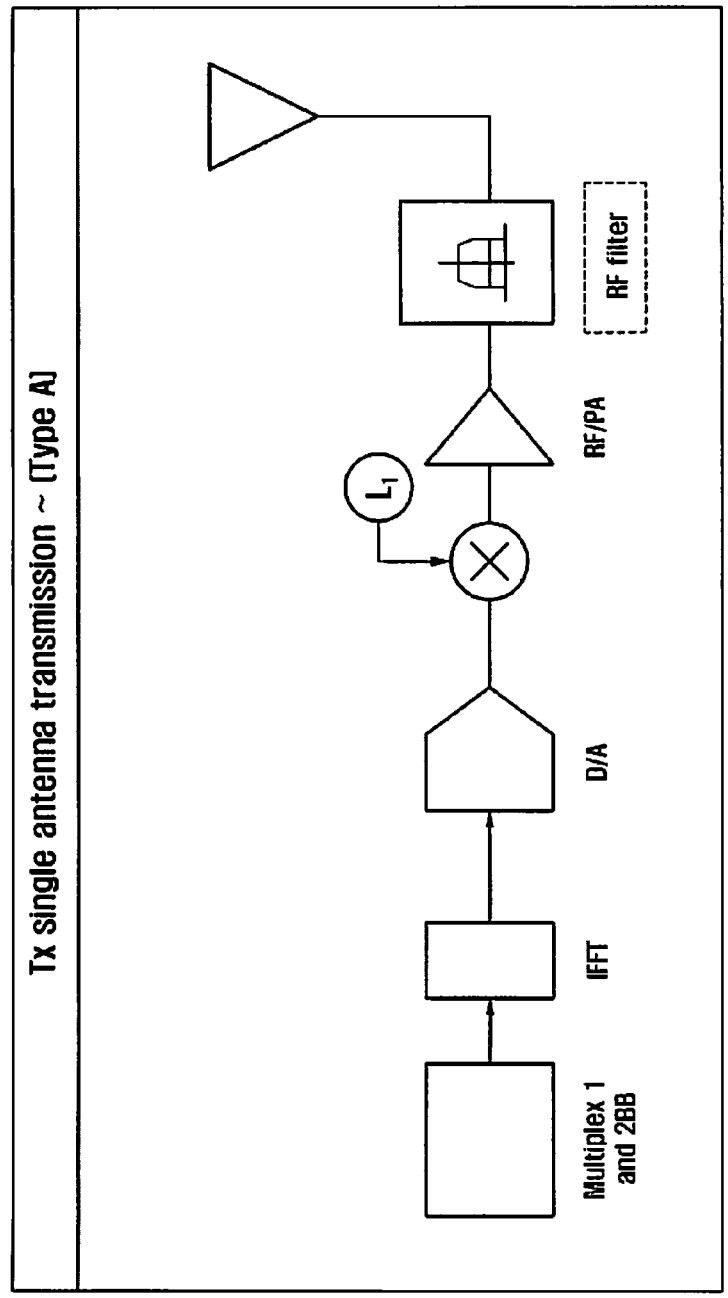
FIGS. 20 to 22 illustrate a configuration of a user equipment capable of aggregating carriers belonging to distant frequency bands together for carrier aggregation.
Figure 21:
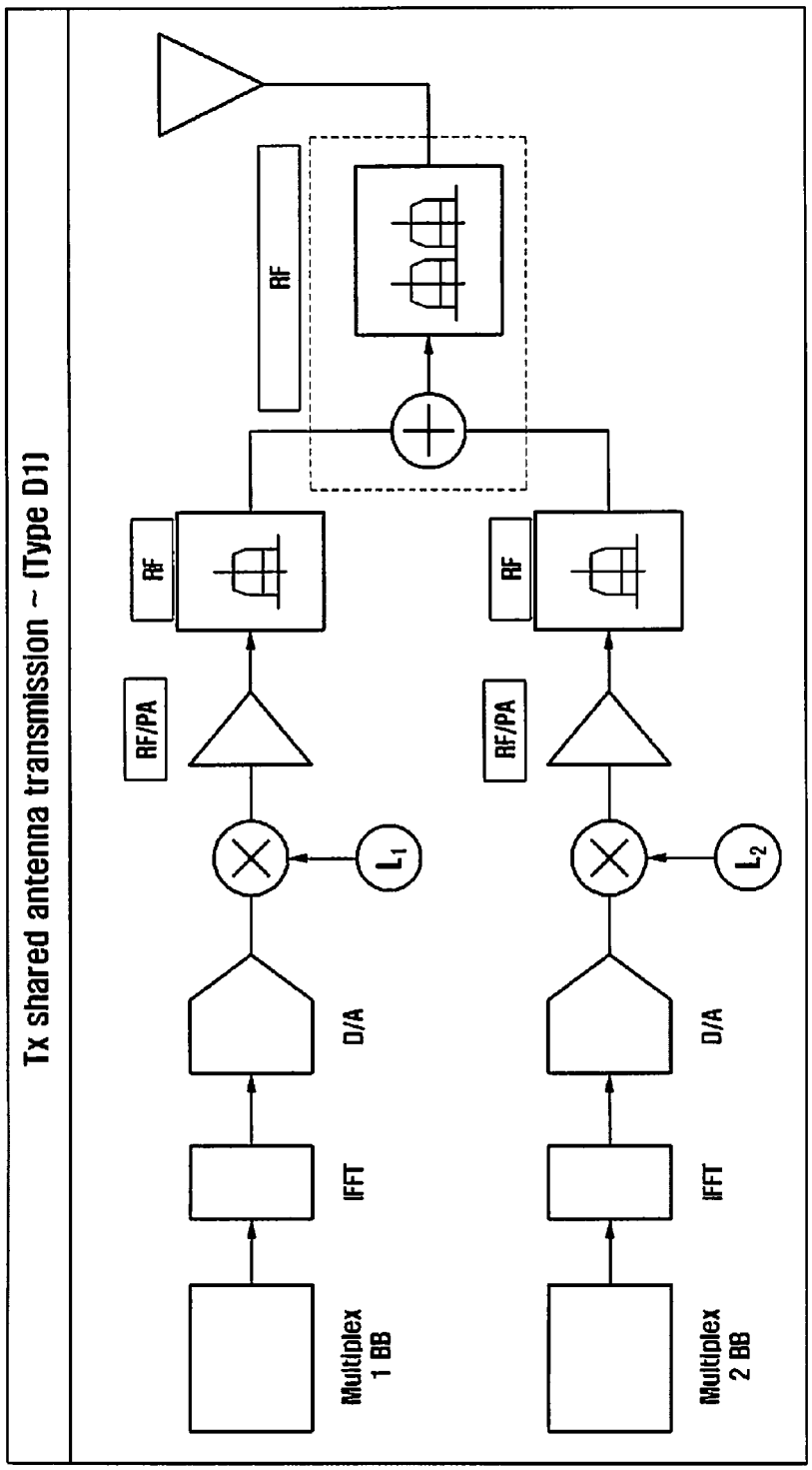
Figure 22:
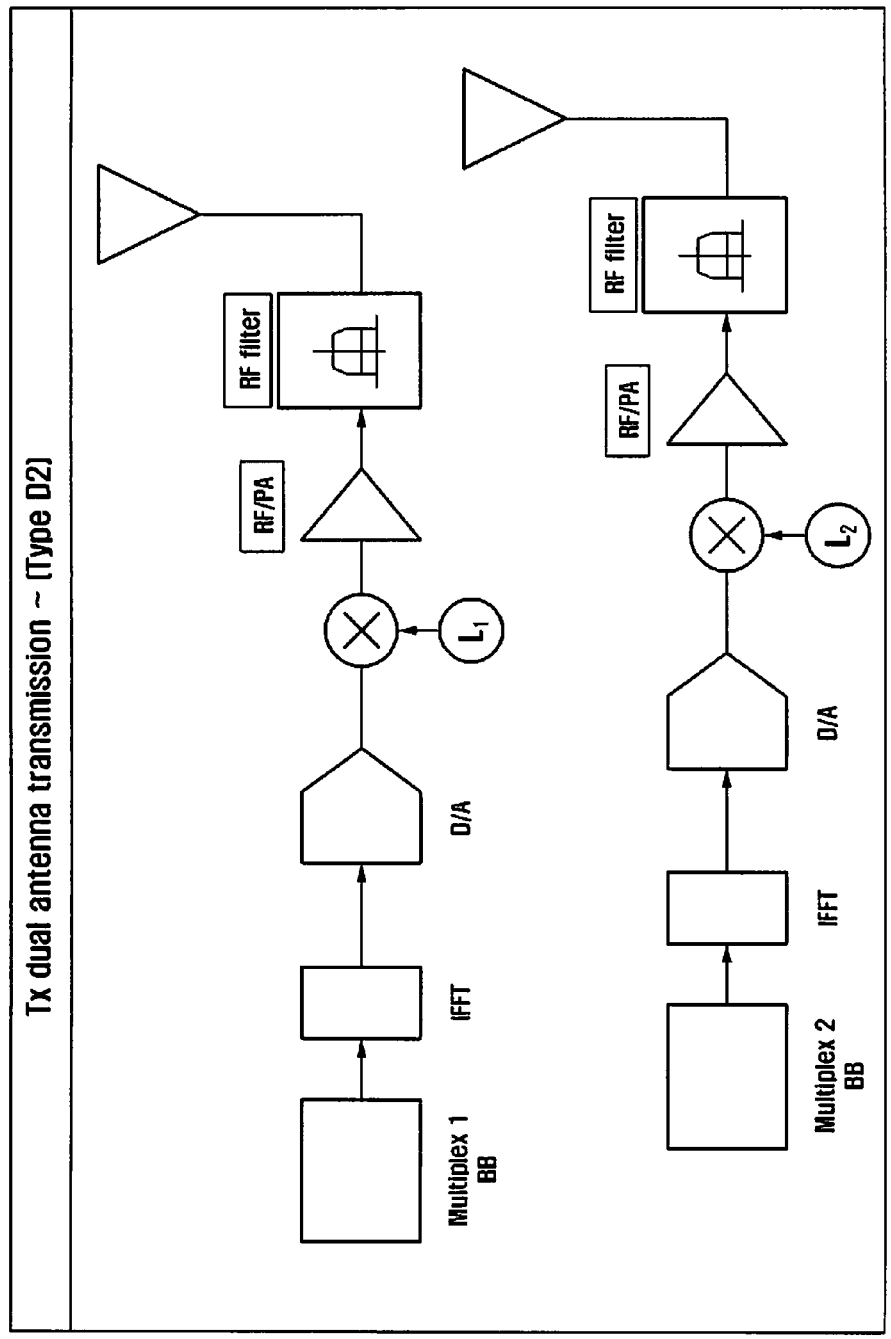

FIGS. 20 to 22 illustrate examples of terminal structures supporting carrier aggregation wherein non-contiguous carriers belonging to different frequency bands are aggregated.

As Type A of FIG. 20 indicates, as frequencies belonging to the same band can be aggregated in carrier aggregation up to Release 10, one power amplifier is sufficient for a UE. Hence, in the case of Type A, the maximum transmit power of a UE is equal to the maximum transmit power of the power amplifier of the UE.

However, when data transmission is separately supported by different bands as Type D1 of FIG. 21 and Type D2 of FIG. 22 indicate, signals are amplified by different power amplifiers (RF PA) for individual frequency bands. Hence, in the case of Type D1 or Type D2, the maximum transmit power of a UE is no longer equal to the maximum transmit power of the power amplifier of the UE. As this issue has not occurred up to Release 10, it is necessary for the ENB to have accurate per-carrier information of the UE for proper scheduling in the near future.

In a wireless communication system supporting carrier aggregation wherein carriers belonging to different frequency bands are aggregated, the UE may use separate power amplifiers to support transmission through different frequency bands. In such a case, the present invention provides a method that enables the ENB to know transmit powers of the individual power amplifiers of the UE.

Specifically, to address the above problem, the present invention proposes three embodiments as follows.

to send a Power Headroom Report (PHR), the UE sends a report for each component carrier (CC) according to the value of a power amplifier associated with the CC.

the difference between the maximum UE transmit power and the current transmit power is reported in the original PHR. In the present invention, the power headroom is computed using the transmit power of each CC instead of the maximum UE transmit power.

the UE explicitly notifies the ENB of actual maximum transmit powers for each cell, frequency and frequency band, and the ENB performs uplink scheduling using this information.

if overall UE transmit power exceeds the maximum transmit power, transmit power adjustment is performed by scaling down the transmit power according to ratios of transmit powers of individual power amplifiers.

According to the above embodiments, even when the UE has multiple power amplifiers with different maximum transmit powers, the UE may receive scheduling information from the ENB and send data in a manner conforming to the maximum transmit powers, enabling proper and efficient resource utilization.

Figure 23:
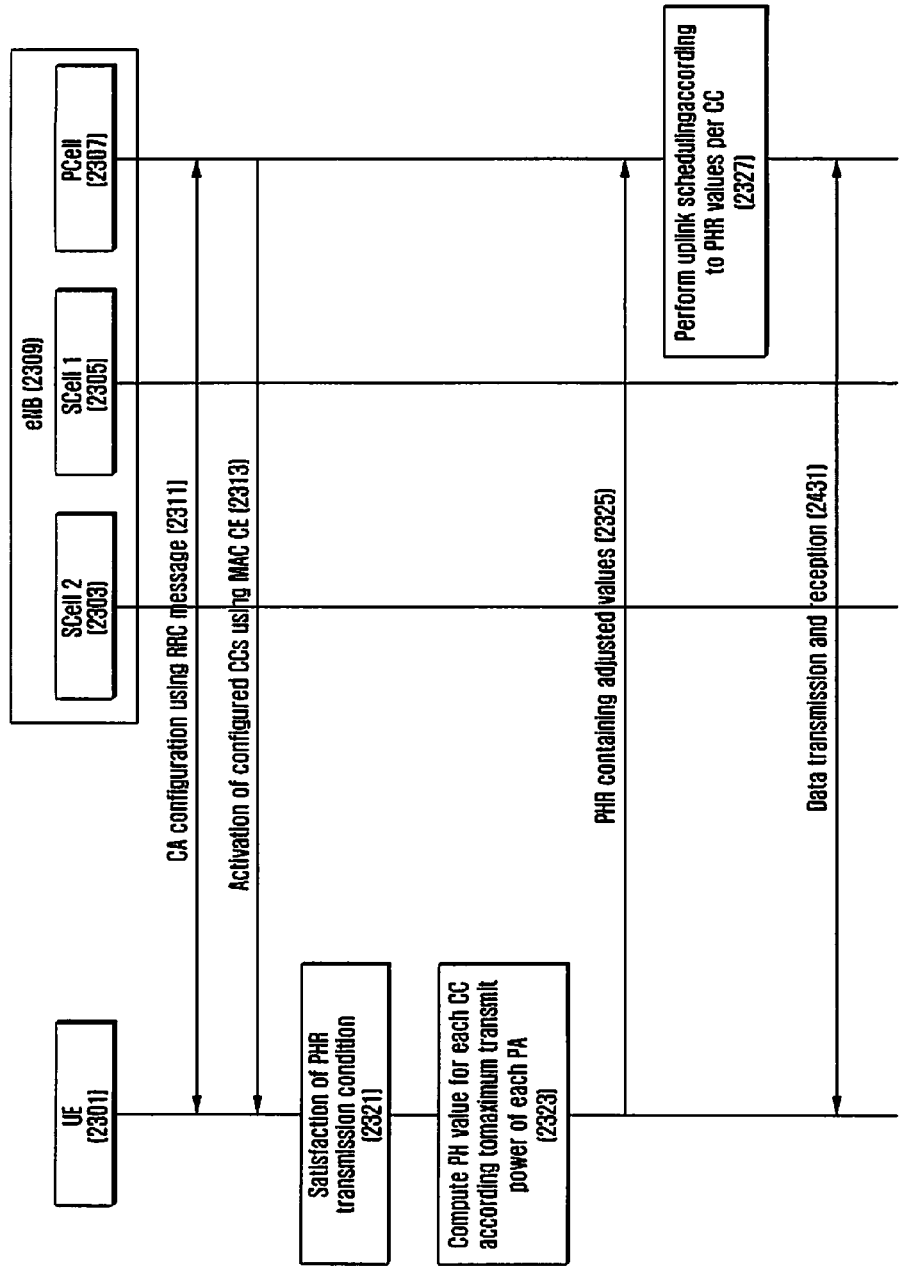
FIG. 23 illustrates a procedure for message exchange between a UE and ENB in a first embodiment wherein maximum transmit powers of multiple power amplifiers are distinct.

FIG. 23 illustrates a procedure for message exchange between a UE and ENB in a first embodiment wherein maximum transmit powers of multiple power amplifiers are distinct.

In FIG. 23, the UE 2301 is connected with the ENB 2309 supporting a number of CCs. Upon connection of the UE 2301, at step 2311, the ENB 2309 sends the UE 2301 a Radio Resource Control (RRC) message indicating configuration of multiple CCs commensurate with UE capability.

For example, when the UE 2301 is CA-capable and supports frequency bands managed by the ENB 2309, the ENB 2309 may configure the UE 2301 to utilize CA. For ease of description, it is assumed that SCell 1 (2305) and SCell 2 (2303) are additionally configured for the UE 2301, SCell 1 and PCell (2307) are different frequencies belonging to the same frequency band, and SCell 2 and PCell are distinct frequencies belonging to different frequency bands.

At step 2313, to activate the CCs configured in the UE 2301, the ENB 2309 notifies the UE 2301 of SCell to be activated by sending an Activation/Deactivation MAC Control Element (CE) (MAC layer message). In the following description, it is assumed that both SCell 1 and SCell 2 are indicated for activation. Upon reception of the Activation/Deactivation MAC CE, the UE 2301 activates the indicated SCells.

Thereafter, the UE 2301 reports the difference between the maximum UE transmit power and measured uplink transmit power for each activated serving cell as a Power Headroom Report (PHR) to the ENB 2309 according to the existing conditions. For PHR transmission, the Power Headroom MAC CE or Extended Power Headroom MAC CE may be used. The Extended Power Headroom MAC CE may be used to report the maximum transmit power for each CC ($P_{CMAX,c}$) and the difference between the maximum transmit power for each CC and measured uplink transmit power for the CC as a Power Headroom (PH) value.

At step 2321, the UE 2301 checks whether a PHR transmission condition is satisfied. As described before, conditions for PHR transmission are described below. If at least one PHR transmission condition is satisfied, the UE 2301 creates a PHR at step 2323 and sends the PHR to the ENB 2309 at step 2325.

prohibitPHR-Timer in the UE 2301 is not running and the path loss has changed more than dl-PathlossChange dB for at least one activated serving cell since the last PHR transmission periodicPHR-Timer expires in the UE 2301

PHR configuration is changed by higher layer (RRC)

configured uplink is activated

Here, it is assumed that the UE 2301 supports inter-band noncontiguous CA wherein CCs belonging to multiple frequency bands are aggregated and uses power amplifiers having different maximum transmit powers to send data through CCs belonging to different frequency bands. Hence, for PH reporting, the UE 2301 creates a PHR for each CC and the PH value is computed in consideration of the maximum transmit power of each power amplifier at step 2323.

For example, for PH reporting in inter-band noncontiguous CA, the maximum UE transmit power for each CC ($P_{CMAX,c}$) is computed using the maximum UE transmit power. Table 2 illustrates equations defined in 3GPP TS 36.101 for computing the maximum UE transmit power for each CC ($P_{CMAX,c}$). In the case of inter-band noncontiguous CA being discussed in the present invention, it can be known that $P_{CMAX,c}$ is computed using the overall UE maximum transmit power ($P_{PowerClass}$).

TABLE 2

| 3GPP TS 36.101 |
|---|
| ...<br>6.2.5A Configured transmitted Power for CA<br>...<br>The configured maximum output power on serving cell c shall be set within the following bounds:<br>$P_{CMAX\_L,c} \leq P_{CMAX,c} \leq P_{CMAX\_H,c}$<br>For intra-band contiguous carrier aggregation:<br>$P_{CMAX\_L,c}$ = MIN { $P_{EMAX,c} - \Delta T_{C,c}$, $P_{PowerClass}$− MAX(MPR $_c$ + A-MPR $_c$, P-MPR $_c$ − $\Delta T_{C,\,c}$ }<br>For inter-band non-contiguous carrier aggregation:<br>$P_{CMAX\_L,c}$ = MIN { $P_{Emax,c} - \Delta T_{C,c}$, $P_{PowerClass}$− MAX(MPR $_c$ + A-MPR $_c$ + $\Delta T_{IB,c}$, P-MPR $_c$ ) − $\Delta T_{C,c}$ }<br>$P_{CMAX\_H,c}$ = MIN { $P_{EMAX,c}$, $P_{PowerClass}$}<br>$P_{EMAX,\,c}$ is the value given by IE P-Max for serving cell c in [7].<br>$P_{PowerClass}$ is the maximum UE power specified in Table 6.2.2-1 without taking into account the tolerance specified in the Table 6.2.2-1.<br>$\Delta T_{IB,c}$ is the additional tolerance for serving cell c as specified in Table 6.2.5A-3<br>... |

However, to compute the maximum UE transmit power for each CC for PH reporting, the present invention proposes utilizing the maximum transmit power of a power amplifier corresponding to a frequency band to which a UE frequency belongs instead of utilizing the overall UE maximum transmit power ($P_{PowerClass}$).

This point is described in more detail below. Referring to FIG. 23, assume that SCell 1 and SCell 2 belong to different frequency bands; uplink transmission on SCell 1 and uplink transmission on SCell 2 are performed through power amplifiers with different transmitter structures (e.g. RF/PA #1 for uplink transmission on SCell 1, RF/PA #2 for uplink transmission on SCell 2); and the maximum transmit power of PA #1 is 20 dBm and the maximum transmit power of PA #2 is 23 dBm. To compute the maximum transmit power for SCell 1, the maximum transmit power of PA #1 (20 dBm) is to be used instead of the $P_{PowerClass}$ value; and to compute the maximum transmit power for SCell 2, the maximum transmit power of PA #2 (23 dBm) is to be used instead of the $P_{PowerClass}$ value.

That is, in the above example, not the maximum transmit power of the UE 2301 (e.g. 23 dBm) but the maximum transmit power of the serving cell (e.g. the maximum transmit power of a power amplifier mapped with the serving cell) is to be used as the $P_{PowerClass}$ value.

When the $P_{PowerClass}$ value is changed as described above, although a transmitter structure composed of multiple power amplifiers with different maximum transmit powers is used, the maximum transmit power of a power amplifier associated with the serving cell is reflected in the $P_{CMAX,c}$ value reported by the UE through an extended PHR MAC CE. Hence, the UE may operate without malfunction.

At step 2325, the UE 2301 sends a PHR that contains $P_{CMAX,c}$ and PH values reflecting the maximum transmit power of a power amplifier associated with a CC. Upon reception of the PHR, at step 2327, the ENB 2309 performs uplink scheduling for the UE 2301 on the basis of accurate information on the maximum transmit power of a power amplifier corresponding to each CC and available power in the UE 2301. At step 2331, the ENB 2309 receives data from the UE 2301.

Figure 24:
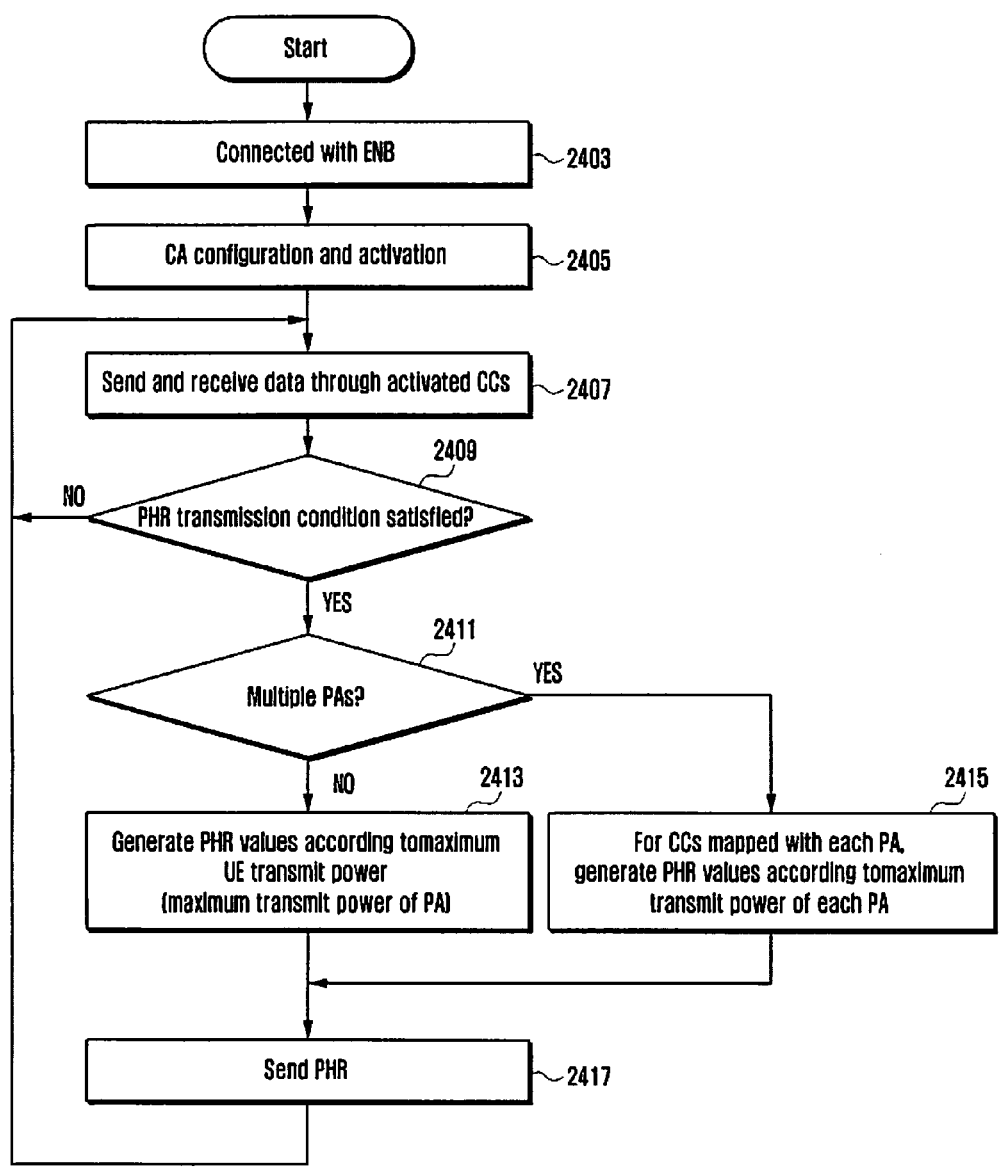
FIG. 24 illustrates UE operation in the first embodiment wherein maximum transmit powers of multiple power amplifiers are distinct.

FIG. 24 illustrates UE operation in the first embodiment wherein maximum transmit powers of multiple power amplifiers are distinct.

Referring to FIG. 24, at step 2403, the UE attempts to access the ENB and is successfully connected with the ENB. Later, at step 2405, the UE receives CA configuration information from the ENB and activates configured CCs according to an activation command from the ENB.

At step 2407, the UE sends and receives data through the activated CCs. During data transmission and reception, at step 2409, the UE checks whether a PHR transmission condition is satisfied. Conditions for PHR transmission are described below. If at least one PHR transmission condition is satisfied, the UE has to perform PHR transmission.

prohibitPHR-Timer in the UE is not running and the path loss has changed more than dl-PathlossChange dB for at least one activated serving cell since the last PHR transmission periodicPHR-Timer expires in the UE PHR configuration is changed by higher layer (RRC)

configured uplink is activated

If at least one of the PHR transmission conditions is satisfied, at step 2411, the UE checks whether multiple power amplifiers are used. Different values may be included in the PHR according to the number of power amplifiers.

If a single power amplifier is used, the procedure proceeds to step 2413. At step 2413, for PHR transmission, the UE computes the maximum UE transmit power for each CC ($P_{CMAX,c}$) using the maximum UE transmit power ($P_{PowerClass}$). That is, when a single power amplifier is used, as the maximum transmit power for each CC is identical to the maximum transmit power of the power amplifier, the maximum UE transmit power ($P_{PowerClass}$) is used without change to compute the values described in FIG. 5.

If multiple power amplifiers are used (as discussed in the present invention), the procedure proceeds to step 2415. At step 2415, for PHR transmission, the UE computes the maximum UE transmit power for each CC using the maximum transmit power of a power amplifier associated with the corresponding frequency band instead of using the overall maximum UE transmit power ($P_{PowerClass}$).

At step 2417, the UE sends the PHR containing the values computed at step 2413 or 2415 to the ENB. Thereafter, the procedure returns to step 2407 for data transmission and reception.

Figure 25:
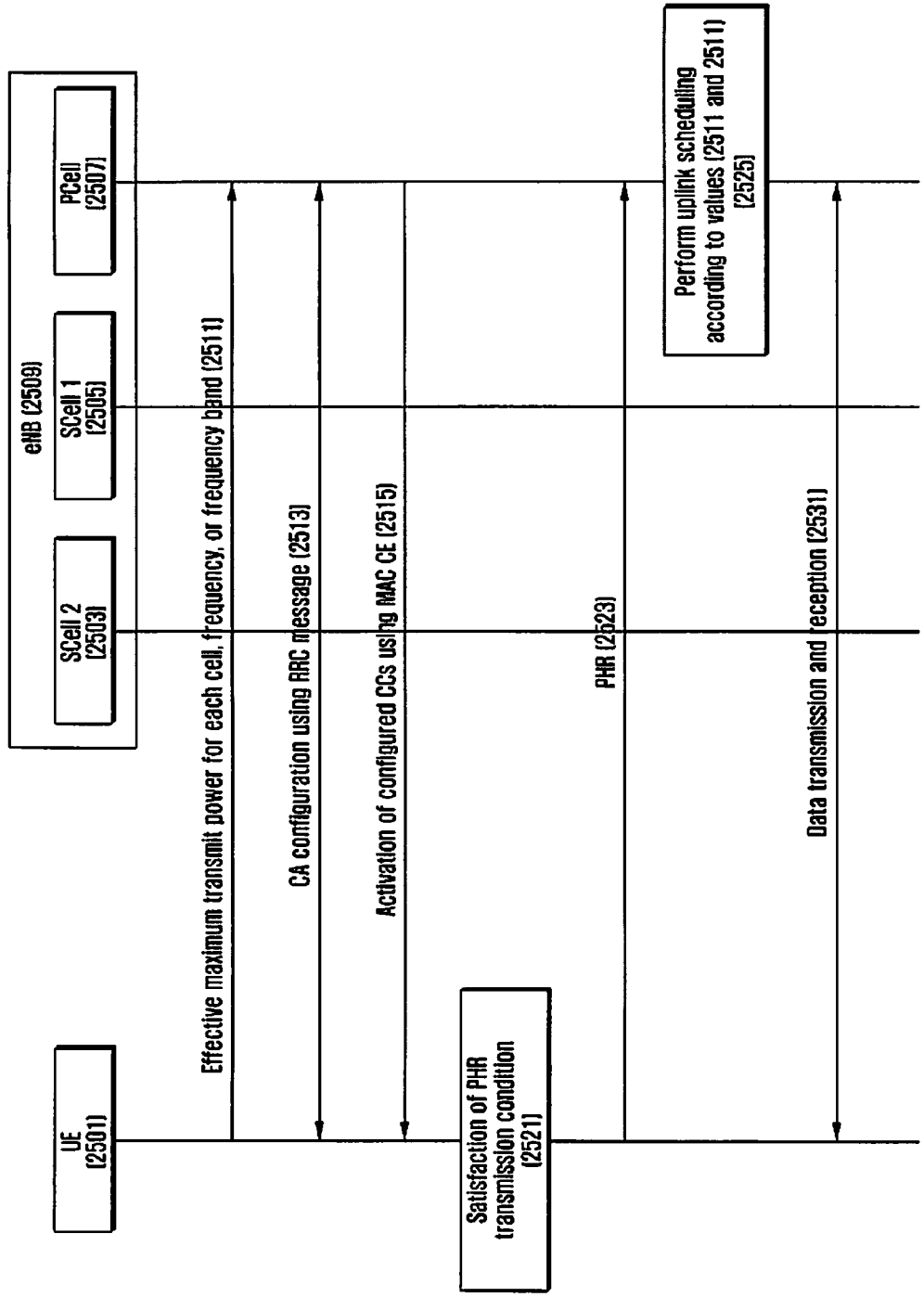
FIG. 25 illustrates a procedure for message exchange between a UE and ENB in a second embodiment wherein maximum transmit powers of multiple power amplifiers are distinct.

FIG. 25 illustrates a procedure for message exchange between a UE and ENB in a second embodiment wherein maximum transmit powers of multiple power amplifiers are distinct.

In FIG. 25, the UE 2501 is connected to the ENB 2509 supporting multiple CCs.

In the event that the ENB 2509 or network has no information on the capability of the UE 2501 after the UE 2501 is connected, at step 2511, the UE 2501 reports the effective maximum transmit power for each cell, frequency or frequency band to the ENB 2509.

As an example, for ease of description, it is assumed that the UE 2501 uses two frequency bands; one frequency band is used for PCell (2507) and SCell 1 (2505) and another frequency band is used for SCell 2 (2503); the UE 2501 has two power amplifiers (PA#1 for PCell and SCell 1, PA#2 for SCell 2) with different maximum transmit powers; and the maximum transmit power $P_{PowerClass}$ of PA#1 is 20 dBm and the maximum transmit power $P_{PowerClass}$ of PA#2 is 23 dBm.

In this case, the UE 2501 notifies the ENB 2509 at step 2511 that the effective maximum transmit power for PCell and SCell 1 associated with PA#1 is 20 dBm and the effective maximum transmit power for SCell 2 associated with PA#2 is 23 dBm. Here, the effective maximum transmit power for each serving cell is signaled to the ENB 2509. However, the effective maximum transmit power for each frequency or for each frequency band may also be signaled.

Thereafter, at step 2513, the ENB 2509 sends the UE 2501 an RRC layer message indicating configuration of multiple CCs commensurate with UE capability. For example, when the UE 2501 is CA-capable and supports frequency bands managed by the ENB 2509, the ENB 2509 may configure the UE 2501 to utilize CA.

At step 2515, to activate the CCs configured in the UE 2501, the ENB 2509 notifies the UE 2501 of SCell to be activated by sending an Activation/Deactivation MAC CE (MAC layer message). In the following description, it is assumed that both SCell 1 and SCell 2 are indicated for activation. Upon reception of the Activation/Deactivation MAC CE, the UE 2501 activates the indicated SCells.

At step 2521, the UE 2501 checks whether a PHR transmission condition is satisfied. Conditions for PHR transmission are described below. If at least one PHR transmission condition is satisfied, the UE 2501 sends a PHR to the ENB 2509.

prohibitPHR-Timer in the UE 2501 is not running and the path loss has changed more than dl-PathlossChange dB for at least one activated serving cell since the last PHR transmission periodicPHR-Timer expires in the UE 2501

PHR configuration is changed by higher layer (RRC)

configured uplink is activated

If at least one of the PHR transmission conditions is satisfied, at step 2523, the UE 2501 sends a PHR to the ENB 2509. Upon reception of the PHR, at step 2525, the ENB 2509 performs uplink scheduling for the UE 2501 by use of information on the effective maximum transmit power for each cell, frequency or frequency band received at step 2511 and information in the PHR received at step 2523.

In other words, as described before, according to information on the effective maximum transmit power for each cell received at step 2511 (a value of 20 dBm as effective maximum transmit power $P_{PowerClass}$ for SCell 1 (maximum transmit power of PA#1) and a value of 23 dBm as effective maximum transmit power $P_{PowerClass}$ for SCell 2 (maximum transmit power of PA#2)), the ENB 2509 performs uplink transmission scheduling on SCell 1 so that the requested uplink transmit power of the UE 2501 does not exceed 20 dBm, and performs uplink transmission scheduling on SCell 2 so that the requested uplink transmit power of the UE 2501 does not exceed 23 dBm. In addition, as the overall maximum transmit power of the UE 2501 is 23 dBm (larger one of 20 dBm and 23 dBm), the ENB 2509 may perform uplink transmission scheduling so that the sum of requested transmit powers for uplink transmission on SCell 1 and uplink transmission on SCell 2 does not exceed 23 dBm.

At step 2531, the ENB 2509 allocates resources to the UE 2501 according to the result of scheduling, and sends and receives data to and from the UE 2501.

Figure 26:
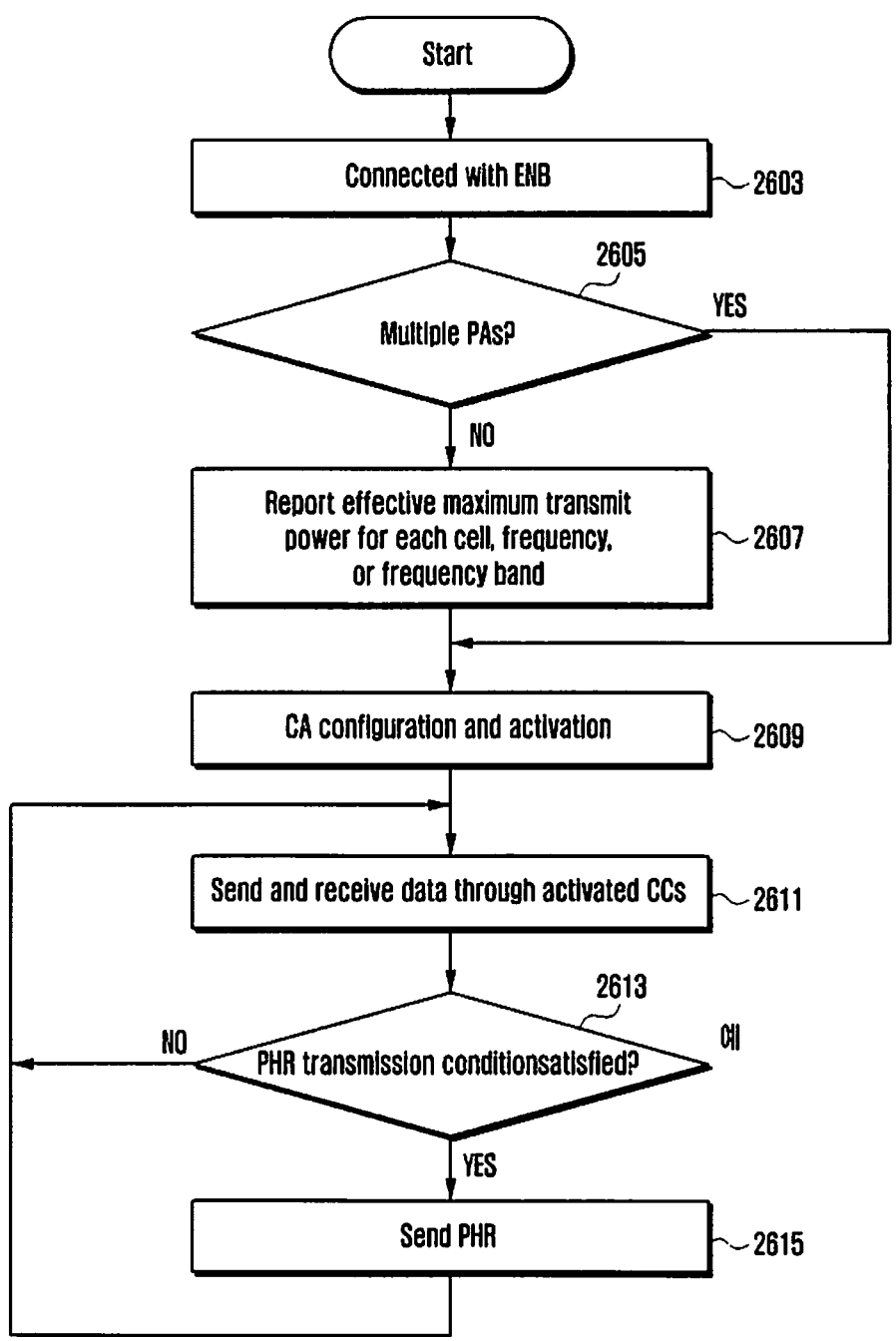
FIG. 26 illustrates UE operation in the second embodiment wherein maximum transmit powers of multiple power amplifiers are distinct.

FIG. 26 illustrates UE operation in the second embodiment wherein maximum transmit powers of multiple power amplifiers are distinct.

Referring to FIG. 26, at step 2603, the UE attempts to access the ENB and is successfully connected with the ENB.

At step 2605, the UE checks whether multiple power amplifiers are used. If multiple power amplifiers are used, at step 2607, the UE reports the effective maximum transmit power for each cell, frequency or frequency band to the ENB. For ease of description, as depicted in FIG. 25, it is assumed that the UE uses two frequency bands; and one frequency band is used for PCell (2507) and SCell 1 (2505) and another frequency band is used for SCell 2 (2503).

It is further assumed that the UE has two power amplifiers (PA#1 for PCell and SCell 1, PA#2 for SCell 2) with different maximum transmit powers; and the maximum transmit power $P_{PowerClass}$ of PA#1 is 20 dBm and the maximum transmit power $P_{PowerClass}$ of PA#2 is 23 dBm. In this case, the UE notifies the ENB at step 2607 that the effective maximum transmit power for PCell and SCell 1 associated with PA#1 is 20 dBm and the effective maximum transmit power for SCell 2 associated with PA#2 is 23 dBm. Here, the effective maximum transmit power for each serving cell is signaled to the ENB. However, the effective maximum transmit power for each frequency or for each frequency band may also be signaled.

Thereafter, at step 2609, the UE receives CA configuration information commensurate with UE capability from the ENB and activates the configured CCs according to an activation command received from the ENB.

At step 2611, the UE sends and receives data through the activated CCs. During data transmission and reception, at step 2613, the UE checks whether a PHR transmission condition is satisfied. Conditions for PHR transmission are described below. If at least one of the PHR transmission conditions is satisfied, the UE has to perform PHR transmission.

prohibitPHR-Timer in the UE is not running and the path loss has changed more than dl-PathlossChange dB for at least one activated serving cell since the last PHR transmission
    periodicPHR-Timer expires in the UE
    PHR configuration is changed by higher layer (RRC)
    configured uplink is activated If at least one of the PHR transmission conditions is satisfied, at step 2615, the UE sends a PHR to the ENB. Thereafter, the procedure returns to step 2611 at which the UE may receive uplink scheduling from the ENB and send data through the activated CCs.

Figure 27:
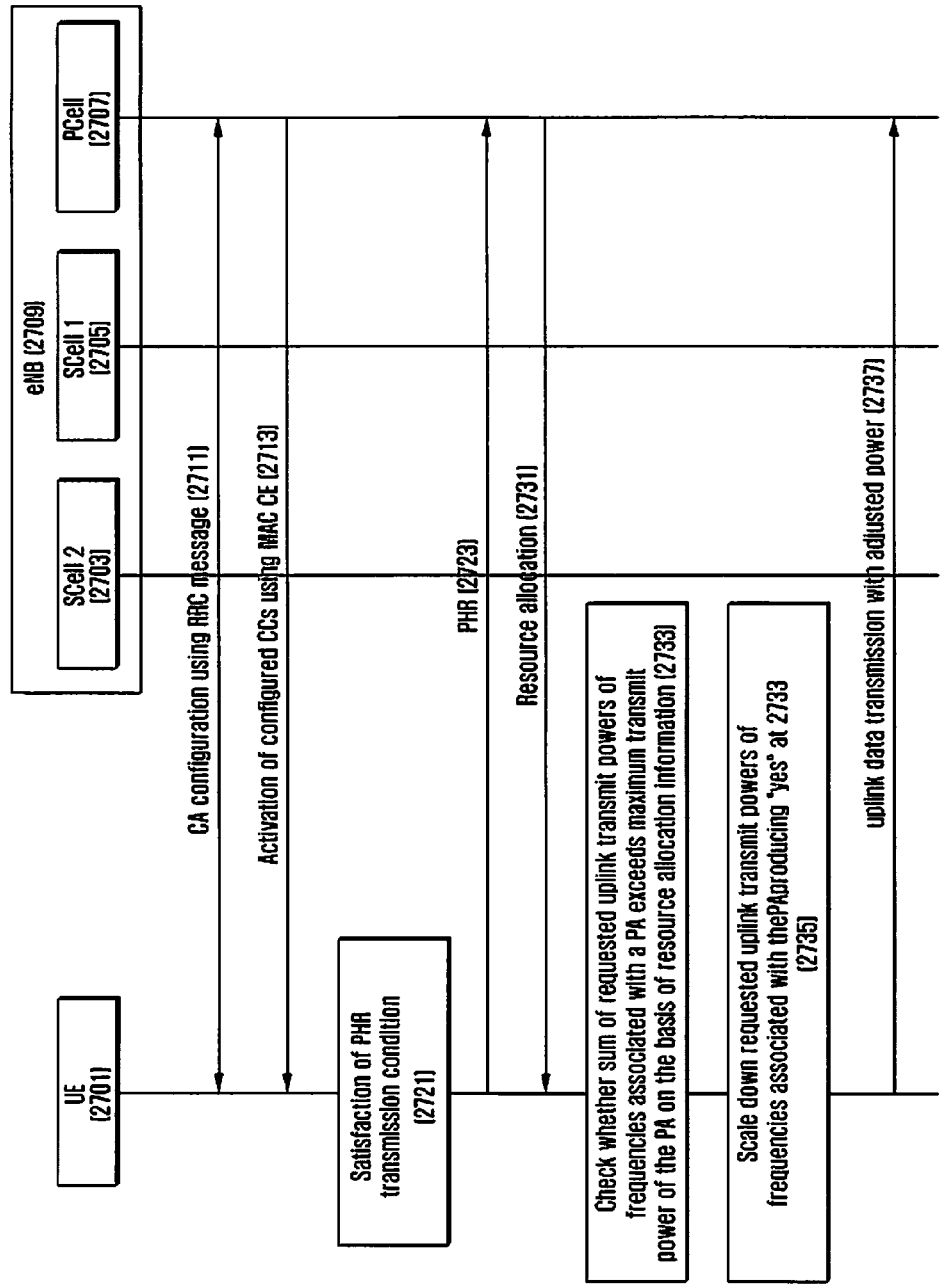
FIG. 27 illustrates a procedure for message exchange between a UE and ENB in a third embodiment wherein maximum transmit powers of multiple power amplifiers are distinct.

FIG. 27 illustrates a procedure for message exchange between a UE and ENB in a third embodiment wherein maximum transmit powers of multiple power amplifiers are distinct.

In FIG. 27, the UE 2701 is connected with the ENB 2709 supporting a number of CCs. Upon connection of the UE 2701, at step 2711, the ENB 2709 sends the UE 2701 an RRC layer message indicating configuration of multiple CCs commensurate with UE capability.

For example, when the UE 2701 is CA-capable and supports frequency bands managed by the ENB 2709, the ENB 2709 may configure the UE 2701 to utilize CA. For ease of description, it is assumed that SCell 1 (2705) and SCell 2 (2703) are additionally configured for the UE 2701, SCell 1 and PCell (2707) are different frequencies belonging to the same frequency band, and SCell 2 and PCell are distinct frequencies belonging to different frequency bands.

At step 2713, to activate the CCs configured in the UE 2701, the ENB 2709 notifies the UE 2701 of SCell to be activated by sending an Activation/Deactivation MAC CE (MAC layer message). In the following description, it is assumed that both SCell 1 and SCell 2 are indicated for activation. Upon reception of the Activation/Deactivation MAC CE, the UE 2701 activates the indicated SCells.

Thereafter, the UE 2701 sends a PHR to the ENB 2709 according to preset PHR transmission conditions. At step 2721, the UE 2701 checks whether a PHR transmission condition is satisfied. Conditions for PHR transmission are described below.

If at least one PHR transmission condition is satisfied, at step 2723, the UE 2701 sends a PHR to the ENB 2709.
    prohibitPHR-Timer in the UE 2701 is not running and the path loss has changed more than dl-PathlossChange dB for at least one activated serving cell since the last PHR transmission
    periodicPHR-Timer expires in the UE 2701
    PHR configuration is changed by higher layer (RRC)
    configured uplink is activated Thereafter, at step 2731, the ENB 2709 performs uplink scheduling for the UE 2701 in consideration of the received PHR and allocates resources to the UE 2701.

Upon reception of resource allocation, at step 2733, the UE 2701 checks whether the sum of requested uplink transmit powers of frequencies associated with a power amplifier exceeds the maximum transmit power of the power amplifier on the basis of resource allocation information. If the sum of requested uplink transmit powers of frequencies associated with a power amplifier exceeds the maximum transmit power of the power amplifier, at step 2735, the UE 2701 scales down the requested uplink transmit powers of the frequencies associated with the power amplifier so that the sum thereof does not exceed the maximum transmit power of the power amplifier. Scaling down may be performed using Equation 8 below.

$$\text{Requested uplink transmit power of a frequency mapped with PA} - (\text{Sum of requested uplink transmit powers of frequencies mapped with PA} - \text{Maximum transmit power of PA})/(\text{Number of frequencies mapped with PA for uplink transmission}) \quad \text{[Equation 8]}$$

For example, assume that the maximum transmit power of the power amplifier (PA#1) supporting PCell and SCell 1 is 20 dBm and the maximum transmit power of the power amplifier (PA#2) supporting SCell 2 is 23 dBm. When the sum of requested uplink transmit powers for PCell and SCell 1 (according to resource allocation by the ENB 2709) exceeds 20 dBm of PA#1, the uplink transmit powers for PCell and SCell 1 are scaled down so that the sum thereof does not exceed 20 dBm.

For PCell, the actual transmit power may be determined by Equation 9.

$$\text{Requested transmit power for } P\text{Cell} - (\text{Requested transmit power for } P\text{Cell Requested transmit power for } S\text{Cell 1} - 20 \text{ dBm})/2 \quad \text{[Equation 9]}$$

For SCell 1, the actual transmit power may be determined by Equation 10.

$$\text{Requested transmit power for } S\text{Cell 1} - (\text{Requested transmit power for } P\text{Cell Requested transmit power for } S\text{Cell 1} - 20 \text{ dBm})/2 \quad \text{[Equation 10]}$$

Figure 28:
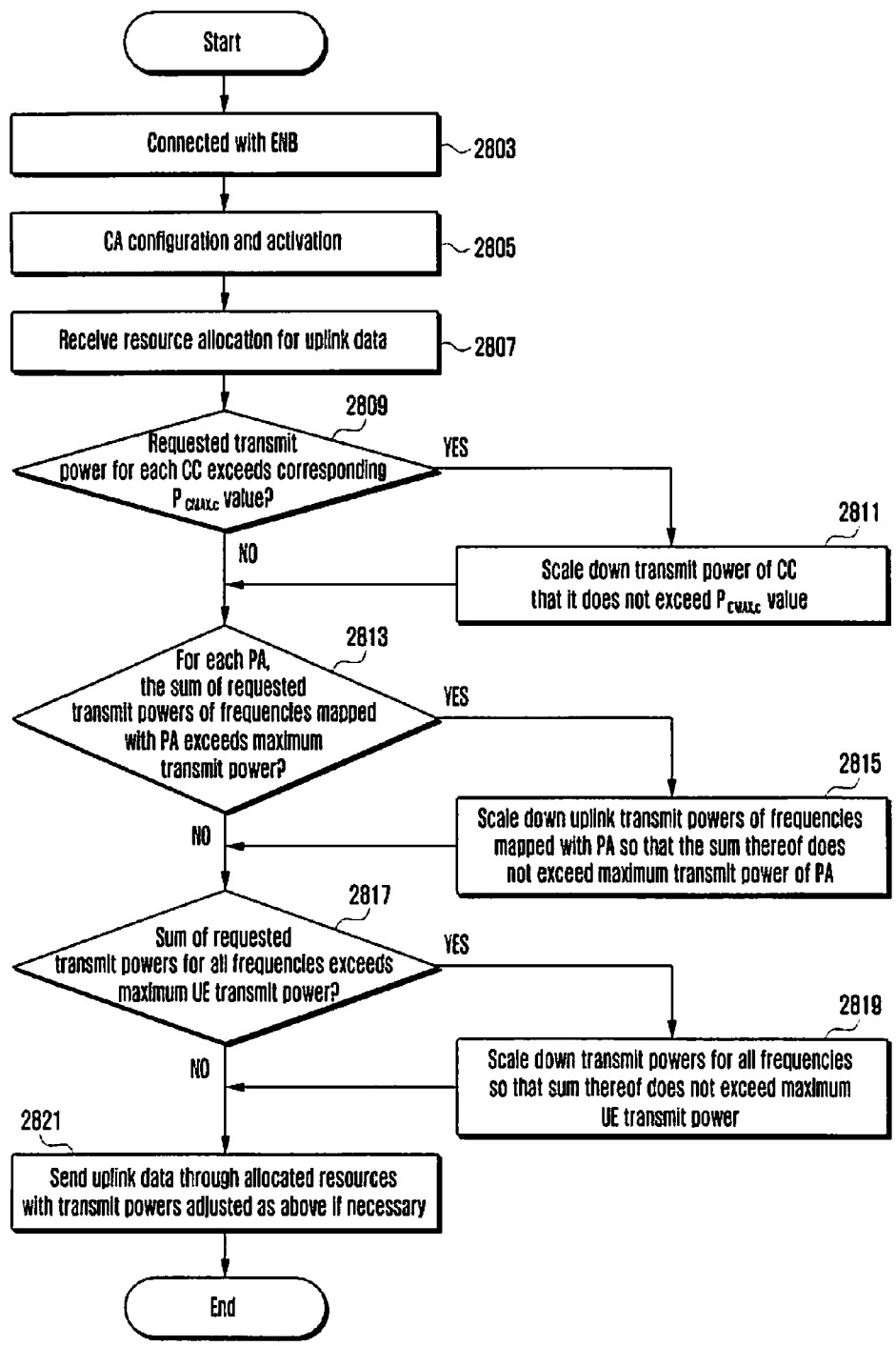
FIG. 28 illustrates UE operation in the third embodiment wherein maximum transmit powers of multiple power amplifiers are distinct.

FIG. 28 illustrates UE operation in the third embodiment wherein maximum transmit powers of multiple power amplifiers are distinct.

Referring to FIG. 28, at step 2803, the UE attempts to access the ENB and is successfully connected with the ENB. At step 2805, the UE receives CA configuration information commensurate with UE capability from the ENB and activates configured CCs according to an activation command from the ENB.

Thereafter, at step 2807, the UE sends a PHR to the ENB and receives resource allocation for uplink data transmission from the ENB.

At step 2809, for each CC, the UE checks whether the requested transmit power of the CC indicated by resource allocation exceeds the $P_{CMAX,c}$ value of the CC. If the requested transmit power of a CC exceeds the $P_{CMAX,c}$ value of the CC, at step 2811, the UE scales down the transmit power of the CC so that it does not exceed the $P_{CMAX,c}$ value of the CC. For example, the transmit power of a CC whose requested transmit power exceeds the corresponding $P_{CMAX,c}$ value may be scaled down to the $P_{CMAX,c}$ value.

At step 2813, for each power amplifier, the UE checks whether the sum of requested transmit powers of frequencies mapped with the power amplifier (if scaled down at step 2811, scaled down values are used) exceeds the maximum transmit power of the power amplifier. If the sum of requested transmit powers of frequencies mapped with a power amplifier exceeds the maximum transmit power of the power amplifier, at step 2815, the UE scales down the uplink transmit powers of frequencies mapped with the power amplifier so that the sum thereof does not exceed the maximum transmit power of the power amplifier.

For example, assume that PCell, SCell 1 and SCell 2 are activated, and PCell and SCell 1 are mapped with PA#1 and SCell 2 is mapped with PA#2. When the sum of requested transmit powers of PCell and SCell 1 exceeds the maximum transmit power of PA#1, the UE scales down the transmit power of PCell using Equation 11 below.

Requested transmit power for PCell−(Requested transmit power for PCell+Requested transmit power for SCell 1−Maximum transmit power of PA#1)/2(Number of uplink frequencies mapped with PA#1)     [Equation 11]

The UE also scales down the transmit power of SCell 1 as above.

At step 2817, the UE checks whether the sum of requested transmit powers for all frequencies (if scaled down at step 2811 or 2815, scaled down values are used) exceeds the maximum UE transmit power. If the sum of requested transmit powers for all frequencies exceeds the maximum UE transmit power, at step 2819, the UE scales down the transmit powers for all frequencies so that the sum thereof does not exceed the maximum UE transmit power.

For example, assume that PCell, SCell 1 and SCell 2 are activated, and PCell and SCell 1 are mapped with PA#1 and SCell 2 is mapped with PA#2. When the sum of requested transmit powers for PCell, SCell 1 and SCell 2 exceed the maximum UE transmit power (here, the maximum UE transmit power may be set to the larger one of the maximum transmit power of PA#1 and the maximum transmit power of PA#2), the UE scales down the transmit power of PCell using Equation 12 below.

Requested transmit power for PCell−(Requested transmit power for PCell+Requested transmit power for SCell 1+Requested transmit power for SCell 2−Maximum UE transmit power)/3 (Total number of uplink frequencies)     [Equation 12]

The UE scales down the transmit power of SCell 1 and SCell as above. At step 2821, the UE sends uplink data through allocated resources with transmit powers adjusted as described above if necessary.

In FIG. 28, transmit power adjustment is performed with respect to the maximum transmit power for each CC, for each power amplifier, and for UE in sequence. However, the adjustment sequence may be changed. For example, transmit power adjustment may be performed with respect to the maximum transmit power for each CC, for UE, and for each power amplifier in sequence.

Figure 29:
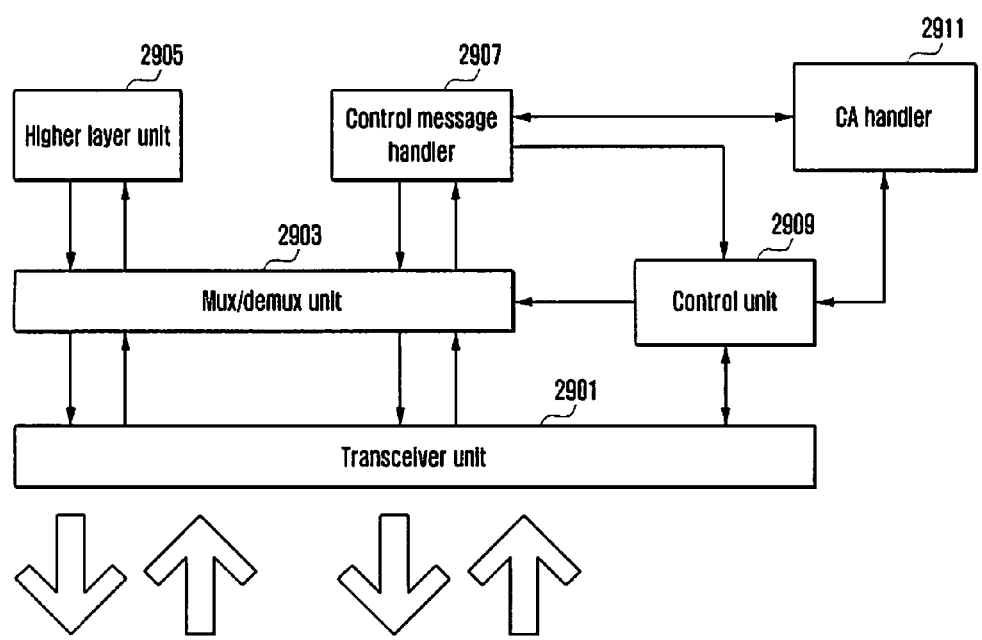
FIG. 29 illustrates a configuration of a UE according to an embodiment of the present invention.

FIG. 29 illustrates a configuration of a user equipment according to the present invention.

Referring to FIG. 29, in the UE, the higher layer unit 2905 is used for transmission and reception of data, and the control message handler 2907 is used for transmission and reception of control messages.

For transmission, under control of the control unit 2909, data and messages are multiplexed through the mux/demux unit 2903 and the multiplexed data is sent through the transceiver unit 2901. For reception, under control of the control unit 2909, physical layer signals are received through the transceiver unit 2901, the received signals are demultiplexed through the mux/demux unit 2903, and the demultiplexed signals are forwarded to the higher layer unit 2905 or the control message handler 2907 according to their types.

Figure 30:
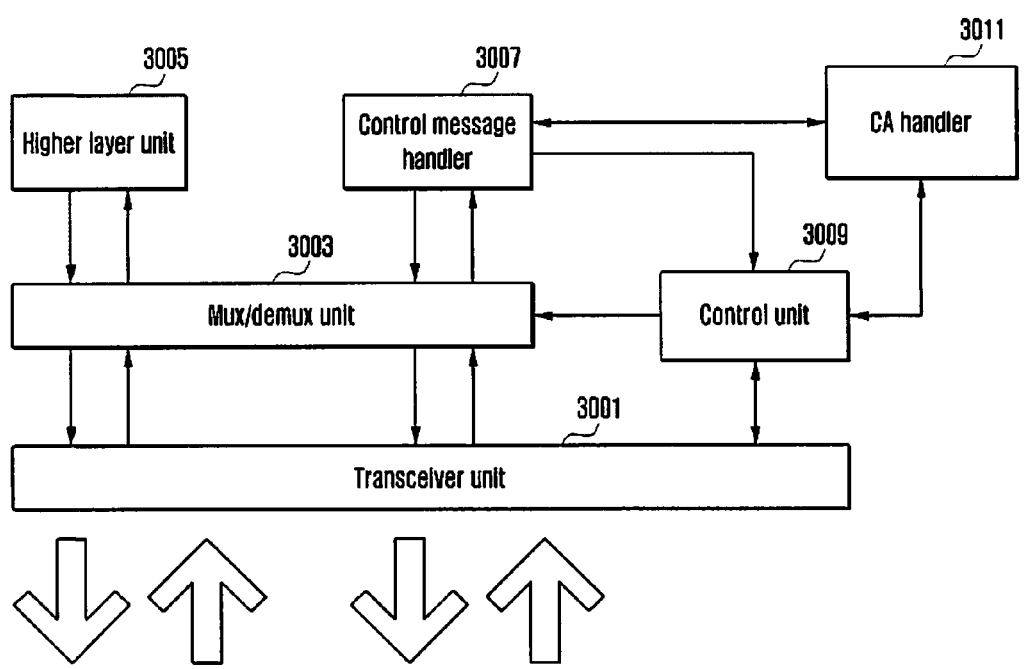
FIG. 30 illustrates a configuration of an ENB according to an embodiment of the present invention.

FIG. 30 illustrates a configuration of an ENB according to the present invention.

Referring to FIG. 30, in the ENB, the higher layer unit 3005 is used for transmission and reception of data, and the control message handler 3007 is used for transmission and reception of control messages.

For transmission, under control of the control unit 3009, data and messages are multiplexed through the mux/demux unit 3003 and the multiplexed data is sent through the transceiver unit 3001. For reception, under control of the control unit 3009, physical layer signals are received through the transceiver unit 3001, the received signals are demultiplexed through the mux/demux unit 3003, and the demultiplexed signals are forwarded to the higher layer unit 3005 or the control message handler 3007 according to their types.

The method described above enables a user equipment having multiple power amplifiers with different maximum transmit powers to receive resource scheduling from the base station and send data thereto in accordance with the different maximum transmit powers, making it possible to utilize transmission resources in an accurate and efficient manner.

The above description with reference to the accompanying drawings is provided to assist in a comprehensive understanding of various embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present invention.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method of terminal operation in a wireless communication system, the method comprising:
receiving a measurement configuration message from a first base station controlling a first cell using a first frequency band;
measuring a first reference signal of the first cell from the first base station;

measuring a second reference signal of a second cell using a second frequency band from a second base station based on the measurement configuration message; and transmitting a measurement report comprising a measurement result of the first reference signal and a measurement result of the second reference signal to the first base station, wherein the measurement configuration message includes pattern information comprising an indication of which subframes the second reference signal is to be transmitted in, a physical cell identity of the second cell and offset information for the second reference signal, and wherein the first reference signal is transmitted in all subframes, and the second reference signal is transmitted in subframes identified based on the pattern information included in the measurement configuration message.

2. The method of claim 1, wherein the first reference signal is a cell reference signal (CRS), and the second reference signal is a channel state indication reference signal (CSI-RS).

3. A method of operation of a first base station in a wireless communication system, the method comprising:

transmitting a measurement configuration message to a terminal;

transmitting a first reference signal of a first cell which is controlled by the first base station on a first frequency band to the terminal; and receiving a measurement report from the terminal, wherein the measurement configuration message includes pattern information for a second reference signal of a second cell which is transmitted from a second base station using a second frequency band, a physical cell identity of the second cell and offset information for the second reference signal, wherein the pattern information comprises an indication of which subframes the second reference signal is to be transmitted in;

wherein the measurement report comprises a measurement result of the first reference signal and a measurement result of the second reference signal, and wherein the first reference signal is transmitted in all subframes, and the second reference signal is transmitted in subframes identified based on the pattern information included in the measurement configuration message.

4. The method of claim 3, wherein the first reference signal is a cell reference signal (CRS), and the second reference signal is a channel state indication reference signal (CSI-RS).

5. A terminal in a wireless communication system, the terminal comprising:

a transceiver configured to transmit and receive signals; and a controller configured to control to:

receive a measurement configuration message from a first base station controlling a first cell using a first frequency band, measure a first reference signal of the first cell from the first base station, measure a second reference signal of a second cell using a second frequency band from a second base station based on the measurement configuration message, and transmit a measurement report comprising a measurement result of the first reference signal and measurement result of the second reference signal to the first base station, wherein the measurement configuration message includes pattern information comprising an indication of which subframes the second reference signal is to be transmitted in, a physical cell identity of the second cell and offset information for the second reference signal, and wherein the first reference signal is transmitted in all subframes, and the second reference signal is transmitted in subframes identified based on the pattern information included in the measurement configuration message.

6. The terminal of claim 5, wherein the first reference signal is a cell reference signal (CRS), and the second reference signal is a channel state indication reference signal (CSI-RS).

7. A first base station in a wireless communication system, the first base station comprising:

a transceiver configured to transmit and receive signals; and a controller configured to control to:

transmit a measurement configuration message to a terminal, transmit a first reference signal of a first cell which is controlled by a first base station on a first frequency band to the terminal, and receive measurement report from the terminal, wherein the measurement configuration message includes pattern information for a second reference signal of a second cell which is transmitted from a second base station using a second frequency band, a physical cell identity of the second cell and offset information for the second reference signal, wherein the pattern information comprises an indication of which subframes the second reference signal is to be transmitted in;

wherein the measurement report comprises a measurement result of the first reference signal and a measurement result of the second reference signal, and wherein the first reference signal is transmitted in all subframes, and the second reference signal is transmitted in subframes identified based on pattern information included in the measurement configuration message.

8. The first base station of claim 7, wherein the first reference signal is a cell reference signal (CRS), and the second reference signal is a channel state indication reference signal (CSI-RS).

* * * * *